(12) United States Patent
Ishihara

(10) Patent No.: US 11,985,273 B2
(45) Date of Patent: May 14, 2024

(54) INFORMATION PROCESSING APPARATUS DETECTS AN EVENT OCCURRENCE OF FAILURE AND ACQUIRES A MANUAL INFORMATION AND PRINT SETTING INFORMATION AND METHOD FOR ACQUIRING WORKFLOW USING TERMINAL ADDRESS

(71) Applicant: SHARP KABUSHIKI KAISHA, Sakai (JP)

(72) Inventor: Masaya Ishihara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/207,159

(22) Filed: Jun. 8, 2023

(65) Prior Publication Data
US 2023/0412739 A1    Dec. 21, 2023

(30) Foreign Application Priority Data
Jun. 20, 2022  (JP) .................................. 2022-098963

(51) Int. Cl.
*H04N 1/00*    (2006.01)
*G06K 7/14*    (2006.01)
*B41J 2/045*    (2006.01)
*G03G 15/00*    (2006.01)

(52) U.S. Cl.
CPC ....... *H04N 1/00079* (2013.01); *G06K 7/1417* (2013.01); *H04N 1/00037* (2013.01); *H04N 1/00344* (2013.01); *B41J 2/0451* (2013.01); *G03G 15/553* (2013.01); *G03G 2215/00548* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,906,416 B2 * | 2/2018 | Hwang | ............... H04L 41/5003 |
| 2002/0049839 A1 * | 4/2002 | Miida | ................. G06F 11/3013 |
| | | | 709/224 |
| 2005/0134893 A1 * | 6/2005 | Han | .................... G06F 11/0769 |
| | | | 358/1.14 |

(Continued)

FOREIGN PATENT DOCUMENTS

JP         2009-169504 A        7/2009

*Primary Examiner* — Haris Sabah
(74) *Attorney, Agent, or Firm* — ScienBiziP, P.C.

(57) ABSTRACT

The present disclosure includes: a display device; a storage storing device setting information that is unique information, with which the information processing apparatus can be identified, and contains model information of an information processing apparatus; an event detector that detects an event occurring when the predetermined function is implemented; an occurred event determination device that determines a content of the detected event, and acquires event detection information; a browsing destination information generator that generates browsing destination information for at least acquiring manual information corresponding to the occurred event by using the device setting information and the event detection information; and a browsing destination information display device that displays the generated browsing destination information on the display device.

11 Claims, 19 Drawing Sheets

(56) References Cited

U.S. PATENT DOCUMENTS

| | | | |
|---|---|---|---|
| 2011/0109932 A1* | 5/2011 | Lee | H04N 1/00408 |
| | | | 358/1.14 |
| 2018/0032020 A1* | 2/2018 | Shintani | G03G 15/70 |
| 2019/0306336 A1* | 10/2019 | Takenaka | H04W 4/80 |
| 2021/0400151 A1* | 12/2021 | Nomura | H04N 1/00079 |

* cited by examiner

FIG. 5

DEVICE SETTING INFORMATION 41

| | | |
|---|---|---|
| MFP DEVICE NAME (MFPNA) | | MFP101 |
| MFP CONNECTION DESTINATION INFORMATION (MFPIPAD) | | IP101 |
| MODEL INFORMATION (KID) | | MX101 |
| LANGUAGE INFORMATION (GID) | | JAPANESE |
| REGION INFORMATION (TID) | | TOKYO |
| VERSION NUMBER INFORMATION (VID) | | VER101 |

SERVER INFORMATION 42

| | | |
|---|---|---|
| SERVER NAME (SVNA) | | SV900 |
| SERVER CONNECTION DESTINATION INFORMATION (SVIPAD) | | SVIP900 |
| CONNECTION ID (SVID) | | SVID01 |
| CONNECTION PASSWORD (SVPW) | | SVPW01 |

MANUAL GUIDE INFORMATION 43

| | | |
|---|---|---|
| EVENT INFORMATION (EVID) (EVENT ID) | | EV01 |
| MANUAL NAME (GDNA) | | FED PAPER JAM WORK |
| MANUAL CONTENT FILE (GDFL) | | GD001 |

FIG. 6

EVENT CORRESPONDENCE INFORMATION 46

| EVENT INFORMATION (EVID) (EVENT ID) | EV01 | EV02 | EV03 |
|---|---|---|---|
| OCCURRED EVENT (EVNA) | FED PAPER JAM | FUSING PAPER JAM | OUT OF TONER |
| MANUAL SAVE DESTINATION (STR) | MFP101 | SV900 | SV900 |

EVENT DETECTION INFORMATION 45

| EVENT DETECTION INFORMATION (KEV) | EV02 |
|---|---|

(DETECT FUSING PAPER JAM BY PAPER TRANSPORT SENSOR)

BROWSING DESTINATION INFORMATION 46 (URLDT)

| | | URL111 | URL222 |
|---|---|---|---|
| MFP CONNECTION DESTINATION INFORMATION | (MFPIPAD) | IP101 | IP101 |
| SERVER CONNECTION DESTINATION INFORMATION | (SVIPAD) | SVIP900 | SVIP900 |
| EVENT DETECTION INFORMATION | (KEV) | EV02 | EV03 |
| MODEL INFORMATION | (KID) | MX101 | MX101 |
| LANGUAGE INFORMATION | (GID) | JAPANESE | JAPANESE |
| REGION INFORMATION | (TID) | TOKYO | TOKYO |
| VERSION NUMBER INFORMATION | (VID) | VER101 | VER101 |

BROWSING DESTINATION CODE 47
(TWO-DIMENSIONAL CODE CONTAINING BROWSING DESTINATION INFORMATION)

FIG. 7

MANUAL DISPLAY DESTINATION SETTING
INFORMATION 48

| MANUAL DISPLAY DESTINATION | SET VALUE |
|---|---|
| MFP DISPLAY SCREEN | 0 |
| USER TERMINAL DISPLAY SCREEN | 1 |

CONTENT REQUEST 49

| TRANSMISSION DESTINATION INFORMATION | (SVIPAD) | SVIP900 | (SERVER CONNECTION DESTINATION INFORMATION) |
| TRANSMISSION SOURCE INFORMATION | (MFPIPAD) | IP101 | (MFP CONNECTION DESTINATION INFORMATION) |
| BROWSING DESTINATION INFORMATION | (URLDT) | URL111 | |

RECEIVED MANUAL CONTENT INFORMATION 50

| EVENT INFORMATION (EVENT ID) | (EVID) | EV02 |
|---|---|---|
| MANUAL NAME | (CNNA) | FUSING PAPER JAM WORK |
| MANUAL CONTENT FILE | (CNFL) | CNF201 |

FIG. 8

SERVER INFORMATION 91

| SERVER NAME (SVNA) | SV900 |
|---|---|
| SERVER CONNECTION DESTINATION INFORMATION (SVIPAD) | SVIP900 |

MFP INFORMATION 92

| MFP DEVICE NAME (MFPNA) | MFP101 | MFP201 |
|---|---|---|
| MFP CONNECTION DESTINATION INFORMATION (MFPIPAD) | IP101 | IP201 |
| CONNECTION ID (SVID) | SVID01 | SVID02 |
| CONNECTION PASSWORD (SVPW) | SVPW01 | SVPW02 |

FIG. 9

MANUAL CONTENT INFORMATION 93

| | | | | | |
|---|---|---|---|---|---|
| MANUAL IDENTIFICATION NUMBER | (CNNO) | CN001 | CN002 | CN101 | CN201 |
| MANUAL NAME | (CNNA) | FED PAPER JAM WORK | FED PAPER JAM WORK | FUSING PAPER JAM WORK | OUT-OF-TONER WORK |
| EVENT INFORMATION (EVENT ID) | (EVID) | EV01 | EV01 | EV02 | EV03 |
| MODEL INFORMATION | (KID) | MX101 MX500 | MX101 MX500 MX700 | MX101 MX500 | MX101 MX500 |
| LANGUAGE INFORMATION | (GID) | JAPANESE | JAPANESE ENGLISH | JAPANESE ENGLISH | JAPANESE |
| REGION INFORMATION | (TID) | TOKYO | TOKYO LONDON | TOKYO LONDON | TOKYO |
| VERSION NUMBER INFORMATION | (VID) | VER101 | VER102 | VER101 | VR101 |
| MANUAL CONTENT FILE | (CNFL) | CNF101 | CNF102 | CNF201 | CNF301 |

RECEIVED CONTENT REQUEST 94

| | | | |
|---|---|---|---|
| TRANSMISSION DESTINATION INFORMATION | (SVIPAD) | SVIP900 | (SERVER CONNECTION DESTINATION INFORMATION) |
| TRANSMISSION SOURCE INFORMATION | (MFPIPAD) | IP101 | (MFP CONNECTION DESTINATION INFORMATION) |
| BROWSING DESTINATION INFORMATION | (URLDT) | URL111 | |

FIG. 10

| RECEIVED BROWSING DESTINATION INFORMATION 95 | (URLDT) | URL111 |
|---|---|---|
| MFP CONNECTION DESTINATION INFORMATION | (MFPIPAD) | IP101 |
| SERVER CONNECTION DESTINATION INFORMATION | (SVIPAD) | SVIP900 |
| EVENT DETECTION INFORMATION | (KEV) | EV02 |
| MODEL INFORMATION | (KID) | MX101 |
| LANGUAGE INFORMATION | (GID) | JAPANESE |
| REGION INFORMATION | (TID) | TOKYO |
| VERSION NUMBER INFORMATION | (VID) | VER101 |

SELECTION CONTENT INFORMATION 96

| MANUAL IDENTIFICATION NUMBER | (CNNO) | CN101 |
|---|---|---|
| MANUAL NAME | (CNNA) | FUSING PAPER JAM WORK |
| EVENT INFORMATION (EVENT ID) | (EVID) | EV02 |
| MODEL INFORMATION | (KID) | MX101 |
| LANGUAGE INFORMATION | (GID) | JAPANESE |
| REGION INFORMATION | (TID) | TOKYO |
| VERSION NUMBER INFORMATION | (VID) | VER101 |
| MANUAL CONTENT FILE | (CNFL) | CNF201 |

DISPLAY SCREEN IN MFP FOR CHECKING MANUAL INFORMATION
(MANUAL GUIDE INFORMATION) SAVED IN MFP (CHECK REQUEST SCREEN: G1)

INFORMATION PROCESSING APPARATUS DETECTS AN EVENT OCCURRENCE OF FAILURE AND ACQUIRES A MANUAL INFORMATION AND PRINT SETTING INFORMATION AND METHOD FOR ACQUIRING WORKFLOW USING TERMINAL ADDRESS

BACKGROUND OF THE INVENTION

Field of the Invention

The present disclosure relates to an information processing apparatus and a manual information processing system and, in particular, to an information processing apparatus and a manual information processing system having a function to provide a user with an instruction manual of the information processing apparatus, or the like.

Description of the Background Art

Conventionally, an image forming apparatus (also referred to as a multifunction peripheral) having a large number of functions, such as a printing function, a document reading function, a read image data transmission function, a fax transmission/reception function, an image data acquisition function, and a character recognition function, has been used.

In the case where a consumable such as a toner cartridge has to be replaced, or failure such as a printing paper transport trouble occurs, consumable replacement work or trouble solving work has to be performed in such an image forming apparatus.

There is a case where, when performing the consumable replacement work or the trouble solving work, a worker performs a predetermined input operation before the work to display an instruction manual of the image forming apparatus, searches a page in which contents of the replacement work to be checked or the like are described, and checks the contents of the replacement work or the like.

There is also a case where, in order to implement a function to be used, the user of the image forming apparatus displays the instruction manual and checks operation contents to implement the function.

The following information processing system has been disclosed. In the case where a client device connected to a printer detects, from an error code informed from the printer, occurrence of failure to the printer, the information processing system acquires a manual request code and a print setting information code, each of which corresponds to the error code, from a database provided to the client device, and transmits these codes to a server device. Then, the server device acquires operation manual information (entity data), which corresponds to the received manual request code and print setting information code, from the operation manual database, and transmits the acquired operation manual information (the entity data) to the client device. Thereafter, the client device displays the received operation manual information (the entity data) and presents the refined operation manual information to the user.

However, since an enormous volume of information is described in the instruction manual of the image forming apparatus (the multifunction peripheral) today with the large number of the functions, it takes time for the worker to search and refer to the contents of the replacement work to be checked or the like, and it takes time for the user to search and refer to the operation contents to be checked. Thus, an operation burden on the worker and the like for checking the desired information is extremely heavy.

In addition, since checking of the instruction manual is extremely troublesome work as described above, many workers and the like make a phone call to an inquiry service without checking the instruction manual. As a result, the inquiry service becomes busy, the workers and the like cannot acquire the necessary information in a timely manner, and cost for the inquiry service is increased.

There is a case where, in the case where the failure occurs, and the client device displays the operation manual information that corresponds to the manual request code and the print setting information code, each of which corresponds to the failure, the client device connectable to the server device is limited to that of a particular type. For this reason, connection information of the client device, which displays the operation manual information, has to be registered in the server device in advance, and the server device cannot transmit the operation manual information except to the registered client device. Thus, the operation manual information cannot be checked on any client device other than the registered client device.

For example, in the case where the client device is a mobile terminal, connection information of the mobile terminal has to be registered in advance in the server device. Then, in the case where the worker or the like does not carry the registered mobile terminal or only carries an unregistered mobile terminal, the operation manual information cannot be displayed, which hinders the prompt work or the like.

In the case where the client device that displays the operation manual information is a personal computer that is installed at a position away from the image forming apparatus, the operation manual information is first checked on the personal computer to comprehend the work content and an operation method for the image forming apparatus. Thereafter, the worker has to walk to the image forming apparatus and performs the work or the like, which makes it difficult for the worker to perform the prompt work or the like.

Furthermore, the operation manual information can also be displayed on a display screen of the image forming apparatus. However, in such a case, when only the operation manual information is displayed on the display screen, the operation screen displaying the operation manual information has to be switched to a predetermined operation screen for a necessary operation. Thus, the worker cannot perform the operation while checking the operation manual information.

In the case where the display screen of the image forming apparatus is segmented to display both of the operation manual information and the predetermined operation screen, the worker can perform the operation while checking the operation manual information. However, there is a case where, since a volume of the displayed information of the operation manual is limited, it takes time for the worker to check the desired operation contents, and the operation burden on the worker is heavy.

The present disclosure has been made in view of circumstances as described above and therefore has purposes of facilitating an operation to retrieve desired manual information from an instruction manual or the like with an enormous volume of information, and allowing a user or the like to quickly browse the desired manual information with a simple operation on a terminal that is not registered in advance as a connectable terminal owned by the user or the like, so as to reduce an operation burden on the user or the like, who attempts to browse the instruction manual or the like, of an information processing apparatus.

SUMMARY OF THE INVENTION

The present disclosure provides an information processing apparatus that implements a predetermined function. The information processing apparatus includes: a display device; a storage that stores device setting information containing model information of the information processing apparatus, the device setting information being unique information, with which the information processing apparatus can be identified; an event detector that detects an event, the event occurring when the predetermined function is implemented; an occurred event determination device that determines a content of the detected event, and acquires event detection information used to identify the content of the event; a browsing destination information generator that generates browsing destination information for at least acquiring manual information corresponding to the occurred event by using the device setting information and the event detection information; and a browsing destination information display device that displays the generated browsing destination information on the display device.

The browsing destination information display device displays, on the display device, a two-dimensional code that is generated by encoding the browsing destination information.

The device setting information further contains: information on a language that is used in the information processing apparatus; information on a region where the information processing apparatus is installed; and version number information of software that is used in the information processing apparatus.

The event detector includes: an action detector that detects action of the information processing apparatus and failure occurred to the information processing apparatus; and an operation detector that detects an operation and work performed for the information processing apparatus. The manual information at least contains information used to assist with implementation of a function of, maintenance of, and an input operation on the information processing apparatus.

The browsing destination information contains: connection destination information used to connect to a document management device, in which the manual information corresponding to the occurred event is saved; the event detection information; and the device setting information.

The browsing destination information is generated as a Uniform Resource Locator (URL) that contains: the information used to connect to the document management device; and information with which it is possible to identify a storage area, where the manual information corresponding to the occurred event is saved, in the document management device.

The present disclosure provides an information browsing device that includes: an image capturer that captures an image of the two-dimensional code of the browsing destination information displayed on the display device of the information processing apparatus described above; a browsing destination information acquirer that acquires the browsing destination information from the captured two-dimensional code; a manual content requester that transmits a content request containing the acquired browsing destination information to a document management device, in which the manual information that corresponds to the occurred event is saved; a second display device; and a manual content display device that displays selection content information on the second display device, the selection content information being the manual information corresponding to the occurred event and transmitted from the document management device.

The present disclosure provides a document management device that includes: a second storage that saves manual content information containing plural pieces of manual information, each of which is associated with an event that possibly occurs in the information processing apparatus; a manual content request receiver that receives the content request from the information browsing device described above; a manual content selector that selects selection content information from the manual content information saved in the second storage by using browsing destination information contained in the content request, the selected selection content information being associated with an event that occurs in the information processing apparatus identified by the browsing destination information; and a manual content transmitter that transmits the selection content information to the information browsing device.

The information processing apparatus may be an image forming apparatus that has plural functions.

The information browsing device may be a mobile terminal that is carried by a user who uses the information processing apparatus.

The present disclosure provides a manual information processing system in which an information processing apparatus implementing a predetermined function, a document management device saving manual information about the information processing apparatus, and an information browsing device displaying the manual information about the information processing apparatus are connected via a network. The information processing apparatus includes: a first display device; a first storage storing device setting information that is unique information, with which the information processing apparatus can be identified, and contains model information of the information processing apparatus; an event detector that detects an event occurring when the predetermined function is implemented; an occurred event determination device that determines a content of the detected event and acquires event detection information used to identify the content of the event; a browsing destination information generator that generates browsing destination information for at least acquiring manual information corresponding to the occurred event by using the device setting information and the event detection information; and a browsing destination information display device that displays, on the first display device, a two-dimensional code generated by encoding the generated browsing destination information. The information browsing device includes: an image capturer that captures an image of the two-dimensional code of the browsing destination information displayed on the first display device of the information processing apparatus; a browsing destination information acquirer that acquires the browsing destination information from the captured two-dimensional code; and a manual content requester that transmits a content request containing the acquired browsing destination information to a document management device saving the manual information corresponding to the occurred event. The document management device includes: a second storage that saves manual content information containing plural pieces of manual information, each of which is associated with an event that possibly occurs in the information processing apparatus; a manual content request receiver that receives the content request from the information browsing device; a manual content selector that selects selection content information from the manual content information saved in the second storage by using browsing destination information contained in the content request, the selected selection content information being associated with an event that occurs in the information processing apparatus identified by the browsing destination information; and a manual content transmitter that transmits the selection content information to the information browsing device. The information browsing device further includes: a second display device; and a manual content display device that displays selection content information on the second display device, the selection content information being the manual information corresponding to the occurred event and transmitted from the document management device.

The present disclosure provides a manual information processing method for an information processing apparatus. The manual information processing method causes a controller provided to the information processing apparatus to: store device setting information that is unique information, with which the information processing apparatus can be identified, and contains model information of the information processing apparatus; detect an event that occurs when a predetermined function of the information processing apparatus is implemented; determine a content of the detected event and acquiring event detection information used to identify the content of the event; generate browsing destination information for at least acquiring manual information corresponding to the occurred event by using the device setting information and the event detection information; and display the generated browsing destination information.

The present disclosure provides a manual information processing method for a manual information processing system in which an information processing apparatus implementing a predetermined function, a document management device saving manual information about the information processing apparatus, and an information browsing device displaying the manual information about the information processing apparatus are connected via a network. The manual information processing method causes a first controller provided to the information processing apparatus to: store device setting information that is unique information, with which the information processing apparatus can be identified, and contains model information of the information processing apparatus; detect an event that occurs when a predetermined function is implemented; determine a content of the detected event and acquiring event detection information used to identify the content of the event; generate browsing destination information for acquiring manual information at least corresponding to the occurred event by using the device setting information and the event detection information; and display, on a display screen of the information processing apparatus, a two-dimensional code that is generated by encoding the generated browsing destination information. The manual information processing method also causes a second controller provided to the information browsing device to execute: capture an image of the two-dimensional code of the browsing destination information that is displayed on the display screen of the information processing apparatus; acquire the browsing destination information from the captured the two-dimensional code; and transmit a content request that contains the browsing destination information to a document management device that saves the manual information corresponding to the occurred event. The manual information processing method causes a third controller provided to the document management device to execute: save manual content information containing plural pieces of manual information, each of which is associated with an event that possibly occurs in the information processing apparatus; receive the content request from the information browsing device; select selection content information from the saved manual content information by using the browsing destination information contained in the content request, the selected selection content information being associated with an event that occurs in the information processing apparatus identified by the browsing destination information; and transmit the selection content information to the information browsing device. The manual information processing method causes a second controller provided to the information browsing device to further displays, on a display screen of the information browsing device, the selection content information that is the manual information corresponding to the occurred event and is transmitted from the document management device.

According to the present disclosure, the browsing destination information for at least acquiring the manual information, which corresponds to the occurred event, is generated by using the device setting information, which is the unique information with which the information processing apparatus can be identified and which contains the model information of the information processing apparatus, and the event detection information used to identify the content of the event that occurs when the predetermined function is executed. Then, the generated browsing destination information is displayed on the display device of the information processing apparatus. Therefore, by using the browsing destination information displayed on the display device, the user of the information processing apparatus can easily perform the operation to acquire the desired manual information, which corresponds to the occurred event, from the manual information with an enormous volume of the information. For example, the user can promptly browse the desired manual information with a simple operation on a mobile terminal carried by the user. Therefore, it is possible to reduce an operation burden on the user and the like of the information processing apparatus who attempt to browse the manual information such as an instruction manual.

BRIEF DESCRIPTION OF THE DRAWINGS

FIG. 5 includes explanatory tables of information that is stored in a storage of the image forming apparatus according to the embodiment of the present disclosure.

FIG. 6 includes explanatory tables of information that is stored in the storage of the image forming apparatus according to the embodiment of the present disclosure.

FIG. 7 includes explanatory tables of information that is stored in a storage of the image forming apparatus according to the embodiment of the present disclosure.

FIG. 8 includes explanatory tables of information that is stored in a storage of the document management device according to the embodiment of the present disclosure.

FIG. 9 includes explanatory tables of information that is stored in the storage of the document management device according to the embodiment of the present disclosure.

FIG. 10 includes explanatory tables of information that is stored in the storage of the document management device according to the embodiment of the present disclosure.

DESCRIPTION OF THE PREFERRED EMBODIMENTS

A description will hereinafter be made on an embodiment of the present disclosure with reference to the drawings. The present disclosure is not limited to the embodiment described below.

Configuration of Manual Information Processing System
A manual information processing system according to the present disclosure is a system that acquires, from a predetermined document management device: manual information about a function that is implemented by an information processing apparatus such as an image forming apparatus; and manual information about maintenance work for solving failure occurred to the information processing apparatus, and the like, and provides the acquired manual information to a user or a worker of the information processing apparatus. In addition, the manual information processing system is a system in which the information processing apparatus implementing a predetermined function, a document management device saving the manual information about the information processing apparatus, and an information browsing device displaying the manual information about the information processing apparatus are connected via a network.

It is assumed that the manual information at least contains information used to assist with implementation of the function of, maintenance of, and an input operation on the information processing apparatus.

In the following embodiment, a description will be made on the manual information processing system that includes the image forming apparatus corresponding to the information processing apparatus.

However, the information processing apparatus is not limited to the image forming apparatus with plural functions, but only needs to be an electronic device that provides manual information about an operation, maintenance work, or the like at the time when the user implements a desired function. Examples of the information processing apparatus are a personal computer, a scanner, a display device, a mobile phone, and an automobile including a digital display device.

Figure 1:
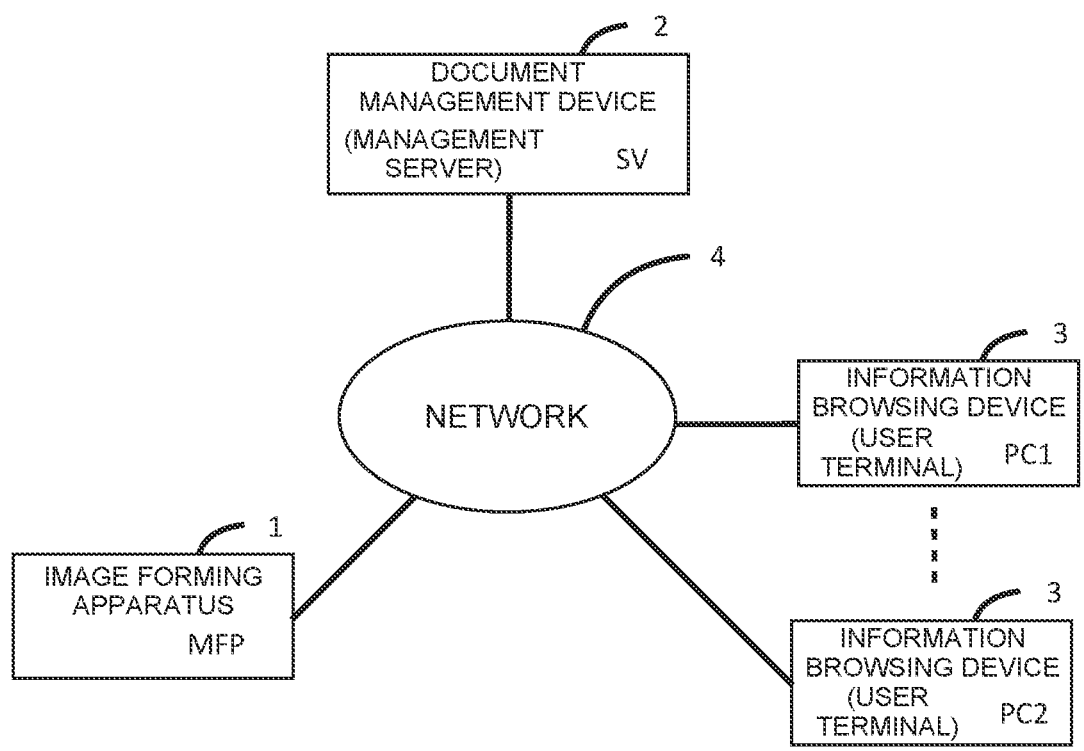
FIG. 1 is a block diagram of a schematic configuration of a manual information processing system according to an embodiment of the present disclosure.

FIG. 1 is a block diagram of a configuration of the manual information processing system according to the embodiment of the present disclosure.

The manual information processing system in FIG. 1 mainly includes: an image forming apparatus 1 that is connected to a network 4 such as a wide area communications network (WAN), such as the Internet, or a local area communications network (LAN); a document management device 2; and an information browsing device 3.

The image forming apparatus 1 (a multifunction peripheral: MFP) is an apparatus that processes image data. The image forming apparatus 1 inputs, forms, outputs, saves, and forwards the image data, and the like.

The image forming apparatus 1 will be referred to as the multifunction peripheral or will simply be referred to as the MFP.

The user who attempts to implement a predetermined function on the image forming apparatus 1 performs an input operation by using an operation key or the like that is provided to the image forming apparatus 1, and thereby implements the predetermined function. The image forming apparatus 1 is connected to the document management device 2 and the information browsing device 3 via the network 4. The number of the image forming apparatus 1 may be one or plural.

In order to acquire the manual information about the desired function, the maintenance work, or the like, browsing destination information is generated in the image forming apparatus 1 according to the present disclosure. The browsing destination information contains information related to such a function or such maintenance work. The browsing destination information is information that is used to identify a location (a storage area) in the document management device 2 saving the manual information about the maintenance work and the like and to acquire the manual information.

In addition, the browsing destination information is generated particularly to acquire manual information that corresponds to an event occurred when the predetermined function is implemented in the image forming apparatus.

As will be described below, the browsing destination information is contained in a content request that is transmitted to the document management device 2.

The browsing destination information is generated on the basis of an input operation for implementing the desired function, an input operation for acquiring the manual information, information on failure occurred to the image forming apparatus, an action status of the image forming apparatus, the maintenance work for the image forming apparatus, the mobile phone, the automobile including the digital display device, or the like.

The input operation, the information on the failure, the action status, and the like, each of which is used to generate the browsing destination information, will each be referred to as the event, and information used to identify each of these events will be referred to as event information.
Furthermore, contents of the manual information partially differ by model of the image forming apparatus, may include information specific to a region of installation, and are preferably displayed in a language comprehended by the user of the image forming apparatus when the manual information is displayed.
Thus, as will be described below, the browsing destination information contains the event information, model information of the image forming apparatus, and information on the language and the region.

The document management device 2 is a device that saves information on the one or plural information processing apparatuses under management, such as the image forming apparatus 1, will also be referred to as a management server, and will simply be referred to as an SV.
For example, an apparatus name of the image forming apparatus 1, connection destination information (an IP address, a domain name, and the like), possessed functions, the installed location, administrator information, user information (a username, a user ID, a password, and the like), and the like are stored per image forming apparatus.

In addition, the document management device 2 in the present disclosure saves manual content information in advance. The manual content information contains plural pieces of the manual information, each of which is associated with an event that possibly occurs in the image forming apparatus 1.

For example, the document management device 2 saves, in advance: the manual information about a large number of the functions possessed by the image forming apparatus 1 (an instruction manual); the manual information about the maintenance work and the like for solving the failure at the time when the failure occurs in the image forming apparatus; and the manual information about troubleshooting of an ICT device used by the user.
Such manual information will be referred to as manual guidance information, the manual content information, or simply manual contents.
The document management device 2 mainly has a function of selecting the manual content, which corresponds to the browsing destination information contained in the content request, from the manual information saved in the document management device in advance and transmitting the selected manual content to a device that has transmitted the content request when receiving the content request transmitted from the image forming apparatus 1 or the information browsing device 3.

As described above, the information browsing device 3 is a device that displays the manual information about the function and the work, and the like for browsing, is the mobile terminal carried by the user who uses the image forming apparatus 1 or the worker such as the administrator who performs the maintenance work of the image forming apparatus, and is referred to as a user terminal or simply a PC.
The information browsing device 3 is preferably a device (the mobile terminal) in such a size and weight that can be carried by the worker or the like at all times, so as to allow the worker or the like to browse the manual information near the image forming apparatus.
For example, any of the mobile phone, a smartphone, a smartwatch, a tablet terminal, a laptop computer, the automobile including the digital display screen, and the like can be used as the information browsing device 3.

The information browsing device 3 acquires the browsing destination information that corresponds to the desired function or maintenance work, transmits the content request containing the browsing destination information to the document management device 2, and displays the manual content transmitted from the document management device 2. The information browsing device 3 is connected to the image forming apparatus 1 and the document management device 2 via the network 4. The number of the information browsing device 3 may be one or plural.

Configuration of Image Forming Apparatus

Figure 3:
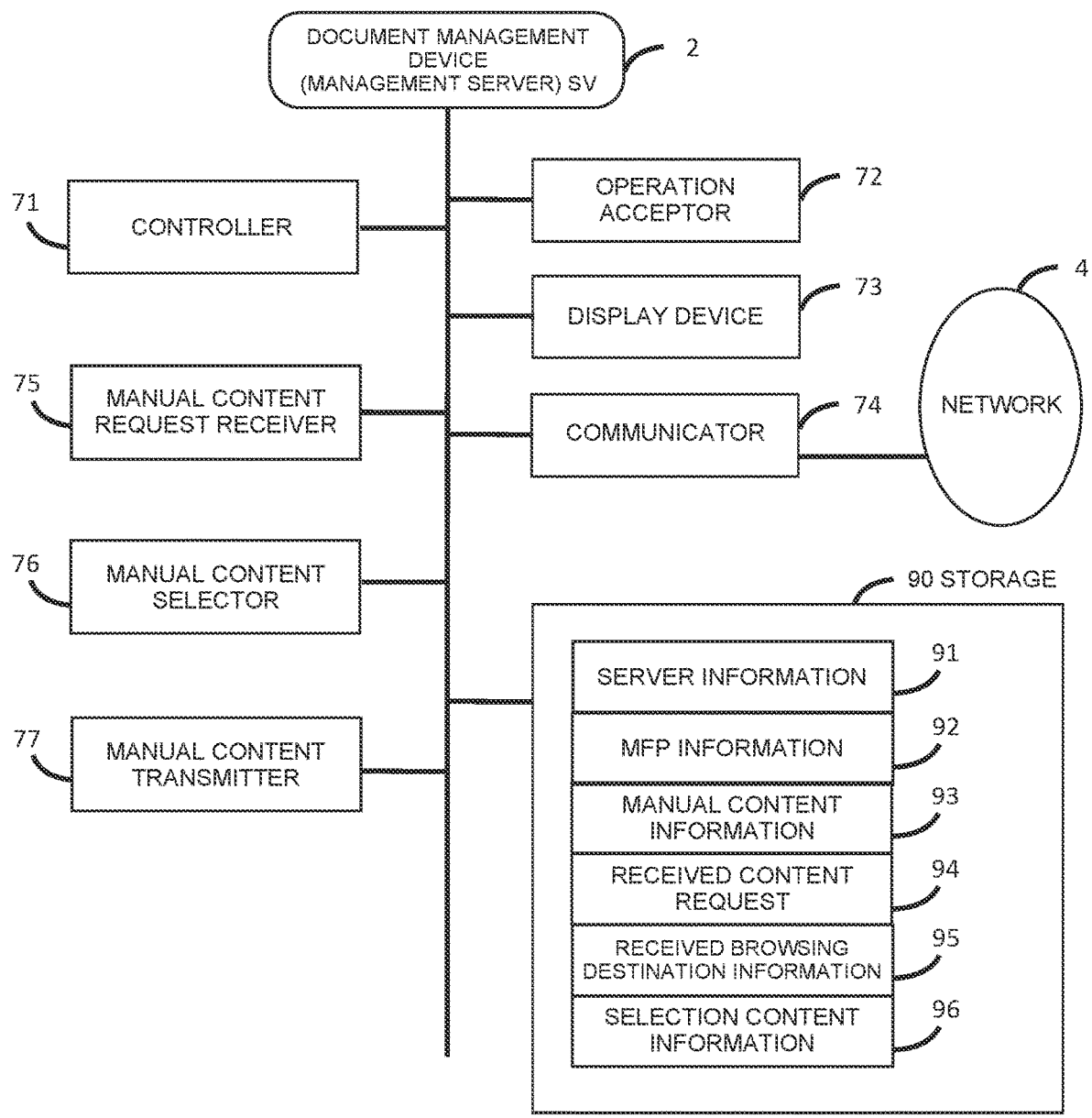
FIG. 3 is a block diagram of a configuration of a document management device according to the embodiment of the present disclosure.

FIG. 3 is a block diagram illustrating a configuration of the image forming apparatus according to the embodiment of the present disclosure.
The image forming apparatus 1 is an electronic apparatus that has functions to process the image data. Examples of such functions are a reproduction (copy) function, a printing function, a document reading (scanning) function, a document editing function, a document saving function, a document transmission (facsimile, scanner, or Internet fax) function, and a communication function.
In the following embodiment, a description will be made that the image forming apparatus 1 according to the present disclosure particularly has the printing function and the document reading function. However, the image forming apparatus 1 may have the functions other than these.

Figure 2:
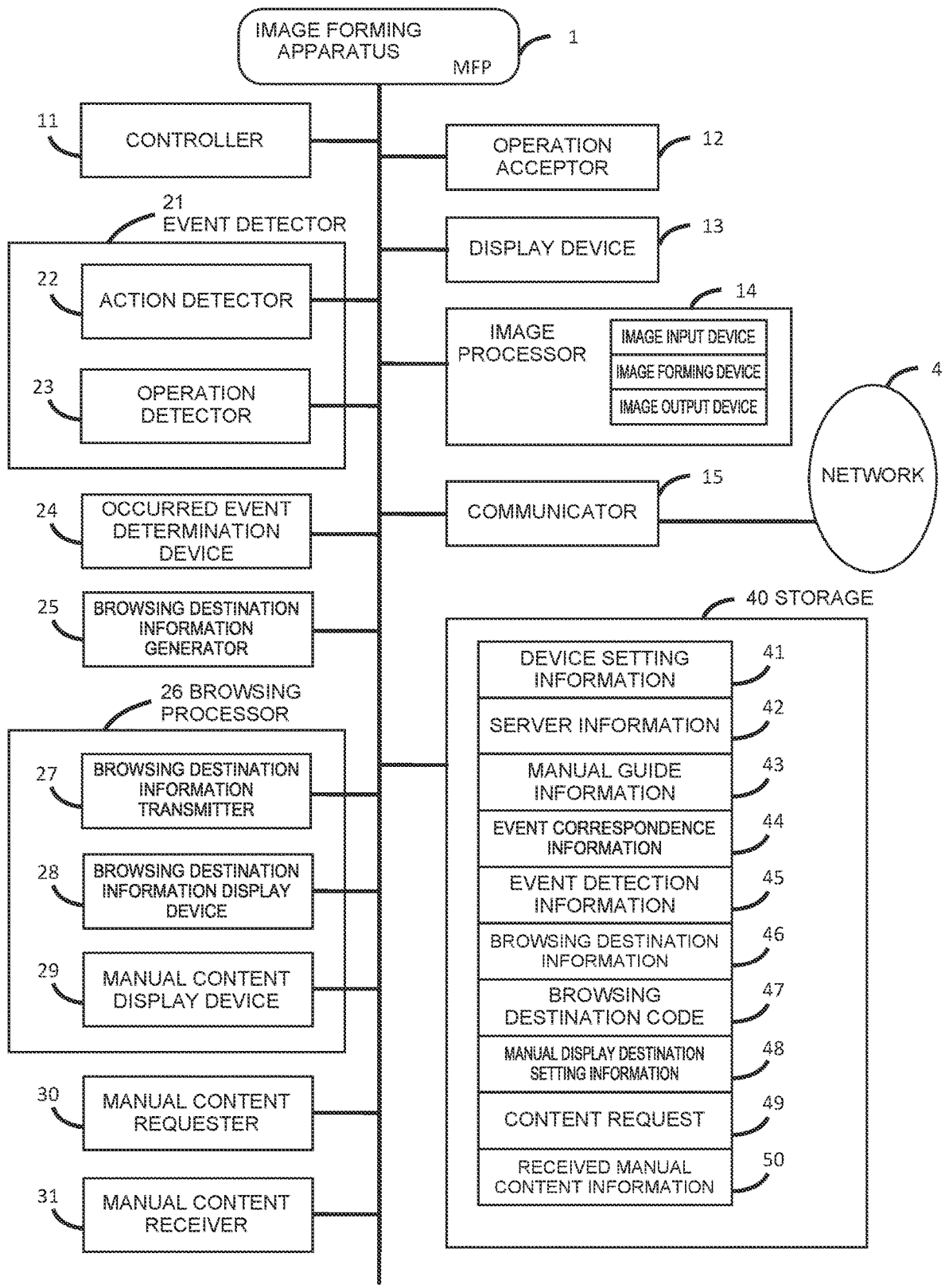
FIG. 2 is a block diagram of a configuration of an image forming apparatus according to the embodiment of the present disclosure.

In FIG. 2, the image forming apparatus (MFP) 1 mainly includes a controller 11, an operation acceptor 12, a display device 13, an image processor 14, a communicator 15, an event detector 21, an occurred event determination device 24, a browsing destination information generator 25, a browsing processor 26, a manual content requester 30, a manual content receiver 31, and a storage 40.
Here, as will be described below, the image processor 14 mainly includes an image input device, an image forming device, and an image output device.
The event detector 21 includes an action detector 22 and an operation detector 23. The browsing processor 26 includes a browsing destination information transmitter 27, a browsing destination information display device 28, and a manual content display device 29.

The controller 11 controls action of each of the components, such as the display device 13 and the image processor 14, and is implemented by a microcomputer that mainly includes a central processing unit (CPU), read only memory (ROM), random access memory (RAM), an input/output (I/O) controller, and a timer.
The CPU organically actuates various types of hardware on the basis of control programs that are stored in non-volatile memory such as the ROM in advance, and implements an image forming function, a browsing destination information display function, and the like in the present disclosure.
Of the above components, each of the occurred event determination device 24, the browsing destination information generator 25, and the like is a functional block that is processed by the CPU on the basis of a predetermined program.

The operation acceptor 12 is an input device with which the user of the image forming apparatus MFP performs a predetermined input operation. For example, the operation acceptor 12 is a component that is used to input information such as characters and to select and input the function. Any of a keyboard, a mouse, a touchscreen, and the like is used as the operation acceptor 12.

Keys that are operated by the user are an action start key, a function selection key, a setting key, and the like.

For example, the user executes reading of a document by operating a touchscreen or performing an input operation of a reading action start key, and starts action to transmit the information such as the image data to a predetermined address by performing an input operation of a transmission start key to start transmission of the information.

The display device 13 is a component that displays the information, and displays required information to implement each of the functions, an implementation result of the function, and the like for the user. For example, a liquid-crystal display (LCD), an organic electroluminescence (EL) display, or the like is used as the display device 13. In the case where a touchscreen is used as the operation acceptor 12, the display device 13 and the touchscreen are superimposed.

For example, the display device 13 displays setting of a set item that is used for printing or the like by the image forming apparatus, required information for implementation of the document reading function or the like, an operation screen for the selected function, and the like by using text, a symbol, a graphic, an image, an icon, an animation, a moving image, and the like.

As will be described below, the image forming apparatus MFP in the present disclosure displays, on the display device 13: a display screen for checking the manual information (manual guide information) that is saved in the image forming apparatus (a check request screen); a display screen for requesting browsing of the manual information (the manual content) saved in the document management device (the management server) (a browsing request screen); and the like.

The image processor 14 is a component for implementing the image forming function that is the primary function of the image forming apparatus MFP, and mainly includes the image input device, the image forming device, and the image output device. Primarily, the image input device is a component that inputs predetermined image data. The image forming device is a component that converts the input image data into information with which the input image data can be printed or the like. The image output device is a component that outputs generated print information or the like onto print paper or the like.

The image input device is a component that inputs document image data containing an image, characters, a graphic, or the like, such as print data to be printed. For example, the image input device is a component that reads the document placed on a document table or the like.

A scanner (a reader) that reads the document containing the information is used as the image input device.

In order to read the document, the image forming apparatus MFP includes: a document placement table (the document table) on which the document is placed; and a document cover that presses the document.

The image forming apparatus MFP may also include an automatic document feeder (ADF) that receives plural sheets of the document placed thereon and automatically transports and reads the plural sheets of the document one by one.

Various methods are available as a method for inputting image information. For example, the document containing the image and the like is scanned by the scanner, and then the image data of the document (hereinafter referred to as input image data) is stored in the storage 40.

For example, an interface, to which an external storage medium such as a USB flash drive is connected, corresponds to the image input device.

An electronic data file of the image information to be input, and the like, may be saved in the external storage medium such as the USB flash drive, the USB flash drive or the like may be connected to an input interface such as a USB terminal, and the predetermined input operation may be performed on the operation acceptor 12, so as to retrieve the desired electronic data file saved in the USB flash drive or the like and store the desired electronic data file as the input image data in the storage 40.

For example, when printing the print data on a recording medium, the image forming device generally performs steps of charging, exposing, developing, transferring, cleaning, static eliminating, and fusing in a continuous manner to form the print data on the recording medium.

In the developing step, toner is supplied from a toner cartridge to a developing device, and an electrostatic latent image formed on a surface of a charged photoreceptor drum is developed to form a toner image corresponding to the electrostatic latent image. The toner image that is formed on the surface of the photoreceptor drum is transferred onto the recording medium by a transfer device, and is then heated by a fusing device to be fused onto the recording medium. The image forming device converts the input image data into information in a transferable and displayable form.

The image output device is a component that outputs the generated input image data and corresponds to a printer, for example.

However, the output of the input image data includes not only printing but also storing of the input image data of the scanned document, fax transmission of the input image data of the scanned document, and the like.

For example, storing the input image data of the read document in the external storage medium such as the USB flash drive, transmitting the input image data to another information processing apparatus or another server via the network such as the Internet, classifying and saving the input image data in a particular save folder also correspond to outputting the image data.

The communicator 15 is a component for data communication with another communicator via the network 4.

For example, as illustrated in FIG. 1, the image forming apparatus (MFP) 1 is connected to the document management device (SV) 2 via the network 4 for the data communication with the document management device.

The image forming apparatus (MFP) 1 may be connected to another image forming apparatus MFP or an information browsing device (PC) 3 owned by the user or the like via the network 4.

For example, in the image forming apparatus MFP, the communicator 15 transmits the content request to the document management device SV, and receives the manual content and the like that are transferred from the document management device SV.

As for the network 4, any communication network, such as the LAN, the WAN such as the Internet, a dedicated communication line, or a telephone lines, can be used. Any existing connection mode can be used as a connection mode of the network 4. The connection mode can be either wired communication or wireless communication.

The event detector 21 is a component that detects the event occurred at the time when the predetermined function is implemented in the image forming apparatus. The event occurred to the image forming apparatus primarily means a change in the action status of the image forming apparatus and includes, for example, an operation of or the work on the image forming apparatus, the action of the image forming apparatus, occurrence of the failure (a trouble), and the like.

As described above, the event detector 21 includes the action detector 22 and the operation detector 23.

As will be described below, information on the detected event is used to generate the browsing destination information that is used to acquire the manual information corresponding to such an event.

The action detector 22 is a component that detects, of the events occurred to the image forming apparatus, the action of the image forming apparatus, the failure (the trouble) occurred to the image forming apparatus, and the like.

Examples of the action of the image forming apparatus are action to supply the toner and action to transport the print paper. Detecting such operation includes: detecting that the toner to be supplied is no longer available (necessity to replace the toner cartridge); detecting that a paper feed tray for the print paper is empty (necessity to replenish the print paper); detecting that time for replacing a consumable part such as the photoreceptor drum comes (necessity to replace the part); and the like.

For example, the necessity to replace the toner cartridge can be detected by receiving, from the toner cartridge, a signal that is output from a toner level sensor attached to the toner cartridge and indicates running out of the toner, for example.

The necessity to replenish the print paper can be detected by checking a signal that is output from a sensor or a switch provided to the paper feed tray and indicates presence or absence of the paper.

The necessity to replace the part can be detected by measuring an operating time or an accumulated rotational frequency of the photoreceptor drum and checking whether either one of these numerical values exceeds a predetermined threshold, for example.

The occurrence of the failure (the trouble) means that, when the predetermined function of the image forming apparatus is implemented, it becomes impossible to continue the function and the function stops. Examples of the occurrence of the failure (the trouble) are a trouble in transporting the document paper (a paper jam), a trouble in transporting the print paper (the paper jam), blurred or misaligned print, failure of the mobile phone, and failure of the automobile including the digital display device.

The trouble in transporting the document paper or the print paper (the paper jam) can be detected by checking a signal that is output from a paper detection sensor arranged in a paper transport path, for example.

The operation detector 23 is a component that detects, of the events occurred to the image forming apparatus, the operation of and the work on the image forming apparatus, and the like.

Examples of the operation of and the work on the image forming apparatus are: an operation to retrieve history of frequently asked questions (FAQ), the instruction manual, or the like; an operation to search for the desired information; an operation to start predetermined maintenance, opening/closing work of a front panel of the image forming apparatus; removal work of the paper feed tray; replacement work of the toner cartridge; and periodical part replacement work such as of a drum cartridge or a fusing unit.

Any of these types of the operations and the work can be detected by input of a predetermined key on the operation acceptor 12 or by monitoring a signal from a sensor or a switch that is attached to the front panel, the paper feed tray, a toner cartridge storage position, or the like.

The occurred event determination device 24 is a component that determines a content of the occurred event detected by the event detector 21, which includes the action detector 22 and the operation detector 23 described above, and acquires information identifying the content of such an event (referred to as event detection information).

In the following embodiment, the event information (also referred to as an event ID) that corresponds to the content of the detected occurred event is acquired as the event detection information 45 by using event correspondence information 44, which will be described below and illustrated in FIG. 6.

For example, in the case where the signal output from the paper detection sensor, which is arranged in the paper transport path, indicates that the print paper transported from the paper feed tray is stopped in the middle of the transport, the event detected by the action detector 22 is determined as a "print paper transport trouble (the paper jam)", and EV01 is acquired as the event information (the event ID) from the event correspondence information 44, which will be described below and illustrated in FIG. 6.

The event information is used to generate the browsing destination information 46 that is used to acquire the manual information corresponding to the occurred event.

The browsing destination information generator 25 is a component that generates the browsing destination information for at least acquiring the manual information corresponding to the occurred event.

For example, the browsing destination information is generated by using device setting information and the event detection information, which will be described below. The browsing destination information contains: the connection destination information (server connection destination information) used to connect to the document management device SV, in which the manual information corresponding to the occurred event is saved; the device setting information; and the event detection information.

Alternatively, the browsing destination information preferably contains information, with which at least the connection to the document management device SV is enabled, and with which a storage area for saving a file of the manual information corresponding to the occurred event can be identified.

In particular, the browsing destination information may be generated as a URL that contains the information with which the storage area of the document management device SV can be identified. In the storage area of the document management device SV, the information used to connect to the document management device SV and the manual information corresponding to the occurred event are saved.

For example, in order to connect to the document management device SV, the IP address or domain information of the document management device SV is used as the connection destination information of the document management device SV.

A URL that contains the domain information is used to identify the storage area where the file of the desired manual information is saved.

The storage area such as the folder in which the file of the desired manual information is saved can be identified by the URL. However, as will be described below, the URL may contain information (the event information, the model information of the image forming apparatus, language information, region information, version number information, and the like) that is associated with the file of the desired manual information in advance. An example of the generated browsing destination information is browsing destination information (URLDT) 46 as illustrated in FIG. 6.

The browsing processor 26 is a component that executes processing for browsing the manual information corresponding to the occurred event.

The browsing processor 26 includes the browsing destination information transmitter 27, the browsing destination information display device 28, and the manual content display device 29 below.

The browsing destination information transmitter 27 is a component that transmits the generated browsing destination information 46 to the information browsing device PC (the user terminal).

For example, as will be described below, in the case where the information browsing device PC (the user terminal) is set and stored in manual display destination setting information 48, in which a device to display the manual information is set in advance, the browsing destination information 46 is transmitted to the information browsing device PC (the user terminal).

The information browsing device PC that has received the browsing destination information transmits the content request containing the browsing destination information to the document management device SV. In this way, the manual content is acquired from the document management device SV, and the manual information that corresponds to the occurred event can be browsed on a display screen of the PC.

The browsing destination information display device 28 is a component that displays the generated browsing destination information 46 on the display device 13 of the image forming apparatus MFP.

The browsing destination information 46 is displayed so as to allow the user or the worker, who carries the information browsing device PC (the user terminal), to browse the manual information corresponding to the occurred event.

In the case where the browsing destination information 46 is the URL, the URL itself including a character string may be displayed on the display device 13.

Alternatively, the display device 13 may display code information that contains the browsing destination information 46. An example of the code information is a two-dimensional code (also referred to as a browsing destination code) that is generated by encoding the browsing destination information according to a predetermined rule.

In the case where the browsing destination code 47 is displayed on the display device 13 of the image forming apparatus MFP, a camera provided to the information browsing device PC (the user terminal) captures an image of the browsing destination code 47, and the browsing destination code 47 is then analyzed by the information browsing device PC to acquire the browsing destination information 46.

By using this acquired browsing destination information 46, in the information browsing device PC, the manual information can be browsed on the display screen of the information browsing device PC.

In this case, the information browsing device PC may not be a device that is registered in the document management device SV in advance. When the user who carries the information browsing device PC captures the image of the browsing destination code 47 displayed on the image forming apparatus MFP, the user can browse the desired manual information with an easy and quick operation.

The manual content display device 29 is a component that displays the manual content acquired from the document management device SV on the display device 13 of the image forming apparatus MFP.

For example, as will be described below, in the case where the image forming apparatus is set and stored in the manual display destination setting information 48, the content request that contains the browsing destination information is transmitted to the document management device SV. As a result, the manual content that is acquired from the document management device SV is displayed on the display device 13.

Alternatively, in the case where the manual information corresponding to the occurred event exists in manual guide information 43 that is stored in the storage 40 of the image forming apparatus MFP, such manual information may be displayed on the display device 13. In this case, the user or the worker of the image forming apparatus browses the manual information on the display screen of the image forming apparatus MFP without using t the information browsing device PC.

The manual content requester 30 is a component that requests the document management device SV to transmit the manual information corresponding to the occurred event to the image forming apparatus MFP.

For example, the manual content requester 30 transmits the content request containing the browsing destination information 46 to the document management device SV.

As will be described below, the document management device SV that has received the content request uses the event detection information 45 and the like as the browsing destination information 46 contained in the content request to search for the manual information corresponding to the occurred event (the manual content) from manual content information 93 that is stored in a storage 90 of the document management device SV.

The manual content receiver 31 is a component that receives the manual content transmitted from the document management device SV in response to the content request described above.

In the case where the manual content receiver 31 receives the manual content, as described above, the manual content display device 29 displays the manual content on the display device 13.

The storage 40 is a component that stores the information and the program required to implement each of the functions of the image forming apparatus MFP according to the present disclosure. A semiconductor storage element such as ROM, RAM, or flash memory, a storage device such as an HDD or an SSD, or another storage medium is used therefor.

For example, the storage 40 stores the device setting information 41, server information 42, the manual guide information 43, the event correspondence information 44, the event detection information 45, the browsing destination information 46, the browsing destination code 47, the manual display destination setting information 48, a content request 49, received manual content information 50, and the like.

FIG. 5, FIG. 6, and FIG. 7 each illustrate an explanatory view of the information that is stored in the storage 40 of the image forming apparatus MFP according to the embodiment.

The device setting information 41 is information that stores information unique to the image forming apparatus MFP, and is set and stored in advance.

The device setting information 41 is unique information, with which the image forming apparatus MFP can be identified, and contains the information used to connect to the image forming apparatus MFP.

Furthermore, the device setting information 41 contains information, such as the model information of the image forming apparatus, that is used to acquire the manual information from the document management device SV.

The device setting information 41 illustrated in FIG. 5 contains an MFP device name (MFPNA), MFP connection destination information (MFPIPAD), model information (KID), language information (GID), region information (TID), and version number information (VID).

The MFP device name (MFPNA) is name information used to identify the image forming apparatus MFP, and is information such as "MFP101". The MFP device name (MFPNA) only needs to be information with which the image forming apparatus MFP can be identified, and may be a product name, an ID number, a serial number, or the like other than the device name.

The MFP connection destination information (MFPIPAD) is information (IP101) used to connect to the image forming apparatus MFP via the network. For example, the IP address that is assigned to the image forming apparatus MFP is used as the MFP connection destination information (MFPIPAD).

The model information (KID) is a model name of the image forming apparatus MFP and is information such as "MX101".

Since the content of the manual information to be used differs by the model of the image forming apparatus MFP, the model information (KID) is used to identify the manual information (the manual content) to be browsed.

By using the model information (KID), the document management device SV, which will be described below, can select the manual information (the manual content), which can be applied to the model identified by the model information (KID), from a large volume of the manual content information saved in the document management device SV.

The language information (GID) is information on a language that is used in the image forming apparatus MFP, and may be country information. An example of the language information (GID) is information such as "Japanese". Normally, the language of the manual information to be browsed desirably matches the language used in the image forming apparatus MFP, and the language information (GID) is used to identify the language of the manual information (the manual content) to be browsed. In the case where the large volume of the manual content information saved in the document management device SV is described in plural languages, by using the language information (GID), the document management device SV can select the manual information (the manual content) that is described in the language identified by the language information (GID).

The region information (TID) is information on a region where the image forming apparatus MFP is installed, and is information such as "TOKYO".

There is a case where a specification constituting the image forming apparatus and an optional device therefor vary by the region where the image forming apparatus MFP is installed, and there is also a case where contents for explaining the specification and the like vary by the region where the image forming apparatus MFP is installed. Accordingly, the region information (TID) is used to identify the manual information (the manual content) to be browsed.

For example, in the case where a component in a cold weather specification is provided, a manual for such a component is possibly added.

The version number information (VID) is version information of software that is currently used in the image forming apparatus MFP, and is information such as "VER101". There is a case where the software is updated to a new version and the version of the currently used software differs from the version of the software that has been used at the time of installation of the image forming apparatus MFP.

In the case where the version of the software differs, a content of the manual for use possibly differs. Accordingly, the version number information (VID) is used to identify the manual information (the manual content) to be browsed.

In the case where the information, which varies by the version of the software, is contained in the manual content information saved in the document management device SV, by using the version number information (VID), the document management device SV can select the manual information (the manual content), which can be applied to the version of the software identified by the version number information (VID).

However, the contents of the device setting information 41 are not limited to the model information and the like described above, and another type of information may be added.

For example, information on environment of a location where the image forming apparatus MFP is installed (environment information) may be added.

The environment information corresponds to a temperature, humidity, and the like of the location where the image forming apparatus MFP is installed. For example, a temperature condition of the MFP installed location or the like (to be used at 0° C. or higher and 30° C. or lower, to be installed in a location without condensation, or the like) is set.

In the case where the information on the temperature or the humidity of the MFP installed location (for example, the description on condensation prevention) is available in the large volume of the manual content information saved in the document management device SV, by using the environment information, the document management device SV can select the manual information (the manual content) with the description related to the environment information from the large volume of the manual content information.

Similar to the device setting information 41, the manual content information 93, which will be described below and saved in the document management device SV, is also stored in association with the model information (KID), the language information (GID), the region information (TID), the version number information (VID), and the like.

The server information 42 is information that is used to identify the document management device SV and used to connect to the document management device SV. As illustrated in FIG. 5, for example, the server information 42 contains a server name (SVNA) used to identify the document management device SV and server connection destination information (SVIPAD).

The server information 42 may further contain a connection ID (SVID) and a connection password (SVPW) for connection authentication processing.

The server name (SVNA) is name information used to identify the document management device SV, and is information such as "SV900". The server name (SVNA) only needs to be information with which the document management device SV can be identified, and may be a product name, an ID number, a serial number, or the like other than the server name.

The server connection destination information (SVIPAD) is information (SVIP900) used to connect to the document management device SV via the network. For example, the IP address, the domain information, the URL, or the like that is assigned to the document management device SV is used as the server connection destination information (SVIPAD).

Each of the connection ID (SVID) and the connection password (SVPW) is information used for general authentication processing. For example, in FIG. 5, "SVID01" is stored as the connection ID (SVID), and "SVPW01" is stored as the connection password (SVPW).

In the case where the URL is used as the server connection destination information (SVIPAD), for example, the server connection destination information (SVIPAD) is saved in the form of https://www.abc.def.co.jp/, for example.

The manual guide information 43 is the manual information (the manual content) that is stored in the image forming apparatus MFP in advance.

In the manual guide information 43 in FIG. 5, event information (EVID), manual name (GDNA), and a manual content file (GDFL) are associated.

The event information (EVID) is information used to identify the event, the manual name (GDNA) corresponds to a name of the manual information to be browsed at the time of the occurrence of the event, and the manual content file (GDFL) is entity data of the manual information to be browsed.

For example, in the manual guide information 43 illustrated in FIG. 5, the manual information corresponding to "EV01" indicates that the manual name (GDNA) is "FED PAPER JAM WORK" and that information to explain work for removing the print paper at the time when the fed print paper is jammed in the transport path (the fed paper jam work) is saved in the manual content file named "GD001". "FED PAPER JAM WORK" means work for removing the stopped print paper at the time when the print paper supplied from the paper feed tray is stopped in the middle of the transport path, and the information (the text, the symbol, the graphic, the still image, or the moving image) explaining the work content is contained in the manual content file "GD001". The manual guide information 43 is not limited to that illustrated in FIG. 5. In the case where plural events are defined, the manual guide information 43 that corresponds to each of the events may be saved.

Here, the manual content file (GDFL) is saved in association with the event. In the case where a predetermined event occurs, in principle, the manual guide information 43 that is associated with the occurred event is displayed on the display device 13 of the image forming apparatus MFP. However, in the present disclosure, in consideration of a fact that the display of the manual guide information 43 on the display device 13 of the image forming apparatus possibly hinders selection of the function of the image forming apparatus, or the like, the manual guide information 43 is preferably displayed on the display device 13 of the image forming apparatus MFP only when the user or the like of the image forming apparatus has authorized the display of the manual guide information 43 on the display device 13 of the image forming apparatus permits the display of the manual guide information 43.

Also, in the case where the manual guide information 43, which is associated with the occurred event, is saved in the image forming apparatus MFP in advance, and the "MFP DISPLAY SCREEN" is set in the manual display destination setting information 48, the manual guide information 43 may be displayed on the display device 13 of the image forming apparatus MFP.

Figure 18:
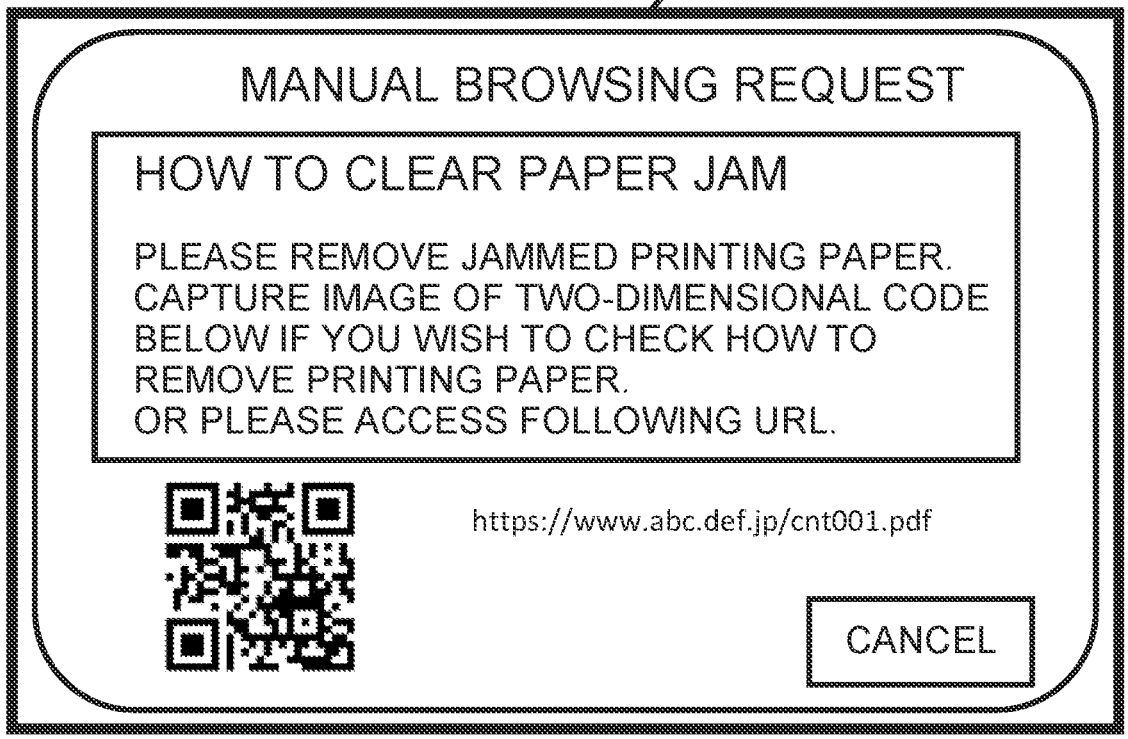
FIG. 18 is an explanatory view of a display screen for checking a manual content in the image forming apparatus according to the embodiment of the present disclosure.

Alternatively, in the case where the manual guide information 43, which is associated with the occurred event, is saved in the image forming apparatus MFP in advance, and "USER TERMINAL PC DISPLAY SCREEN" is set in the manual display destination setting information 48, the manual guide information 43 may not be displayed on the display device 13 of the image forming apparatus MFP. In this case, the browsing request screen as illustrated in FIG. 18, which will be described below, is preferably displayed on the display device 13.

In the case where all pieces of the manual information corresponding to the events are saved in the document management device SV but not in the image forming apparatus MFP, the manual guide information 43 is not stored.

The event correspondence information 44 is information that is set and stored in advance to determine to which event information (EVID) the occurred event detected by the event detector 21 corresponds to.

In the event correspondence information 44 illustrated in FIG. 6, the event information (EVID), an occurred event (EVNA), and a manual save destination (STR) are saved in association with each other.

The event information (EVID) is the information used to identify the event. The occurred event (EVNA) is information used to identify the detected occurred event. The manual save destination (STR) is information indicating where the entity of the manual information corresponding to the event information (EVID) is saved.

In the case where all the pieces of the manual information are stored in the document management device SV in advance but not in the storage 40 of the image forming apparatus MFP, the manual save destination (STR) may not be provided.

In the event correspondence information 44 illustrated in FIG. 6, for example, the occurrence event (EVNA), whose event information (EVID) corresponds to "EV01", indicates "FED PAPER JAM" and that the save destination of the manual information (the manual guide information) for clearing the "FED PAPER JAM" is the image forming apparatus MFP with the apparatus name of MFP101.

In addition, the occurrence event (EVNA), whose event information (EVID) corresponds to "EV02", indicates "FUSING PAPER JAM" and that the save destination of the manual information (the manual guide information) for clearing the "FUSING PAPER JAM" is the document management device SV with the server name of SV900. "FUSING PAPER JAM" means a status (an event) in which the print paper is stopped in the paper transport path near the fusing device of the image forming apparatus.

However, the event correspondence information 44 is not limited to that illustrated in FIG. 6. For example, information detected by the action detector 22 (a detection signal) or the content of the operation or the work detected by the operation detector 23 (key input, door opening, or the like) may be stored in association with the event information (EVID). The occurred event determination device 24 described above identifies the occurred event on the basis of the information detected by the action detector 22 or the operation detector 23, and uses the event correspondence information 44 to acquire the event information (EVID) that corresponds to the occurred event.

The event detection information 45 is a detected event (KEV) that corresponds to the occurred event identified on the basis of the information detected by the action detector 22 or the operation detector 23 described above, and corresponds to the event information (EVID) acquired by the occurred event determination device 24.

The event detection information 45 (KEV) in FIG. 6 is "EV02", which means that a paper transport sensor arranged in the transport path near the fusing device detects the stop of the print paper (the fusing paper jam).

The browsing destination information 46 is information that is generated by the browsing destination information generator 25.

As it has already been described, the browsing destination information 46 (URLDT) contains: the information used to connect to the document management device SV (connection information); and the information (manual content identification information) with which the storage area, where the file of the manual information corresponding to the occurred event is saved, can be identified.

The browsing destination information 46 (URLDT) in FIG. 6 contains the MFP connection destination information (MFPIPAD), the server connection destination information (SVIPAD), the event detection information (KEV), the model information (KID), the language information (GID), the region information (TID), and the version number information (VID).

The MFP connection destination information (MFPIPAD), the model information (KID), the language information (GID), the region information (TID), and the version number information (VID) are the information contained in the device setting information 41 that has already been described. The server connection destination information (SVIPAD) is information contained in the server information 42 that has already been described. The event detection information (KEV) is information corresponding to the event detection information 45 that has already been described.

In other words, the browsing destination information 46 (URLDT) in FIG. 6 is generated by using the device setting information 41, the server information 42, and the event detection information 45.

The browsing destination information 46 (URLDT) in FIG. 6 indicates two pieces of the browsing destination information 46 (URL111 and URL222).

For example, in the browsing destination information URL111, the MFP connection destination information (MFPIPAD) is "IP101", the server connection destination information (SVIPAD) is "SVIP900", the event detection information (KEV) is "EV02", the model information (KID) is "MX101", the language information (GID) is "JAPANESE", the region information (TID) 15 "TOKYO", and the version number information (VID) is "VER101".

This browsing destination information URL111 means that the device as a browsing requesting source is the MFP with "IP101", that the connection destination is the server with "SVIP900", and that a file of the manual information identified by five pieces of the information, the event detection information "EV02", the model information "MX101", the language information "JAPANESE", the region information "TOKYO", and the version number information "VER101", is browsing requested information.

The browsing destination information 46 mainly contains the information as illustrated in FIG. 6. However, as described above, in the case where the URL is used as the server connection destination information (SVIPAD), the browsing destination information 46 may be generated as information in the form that contains the event detection information onward in this URL.

For example, the browsing destination information 46 may be generated in the form of the following URL.

The browsing destination information 46 is contained in the content request and is transmitted to the document management device SV.

The browsing destination information 46 (URLDT) in FIG. 6 is information that is contained in the content request transmitted from the image forming apparatus MFP to the document management device SV.

However, in the case where a portion corresponding to the MFP connection destination information (MFPIPAD) in the browsing destination information 46 is defined as information that serves as the destination of the manual content to be transmitted from the document management device SV, and, as will be described below, in the case where the information browsing device PC transmits the content request containing the browsing destination information 46 to the document management device SV, the portion corresponding to the MFP connection destination information (MFPIPAD) in the browsing destination information 46 is preferably replaced with PC connection destination information (for example, the IP address of the PC).

The generated browsing destination information 46 is not limited to the browsing destination information 46 (URLDT) illustrated in FIG. 6, and only needs to contain the connection information and information corresponding to the manual content identification information. For example, the manual content identification information at least contains the event information and the model information. In the case where it is clear that the manual content is only used in Japan and there is no regional difference, the manual content identification information may contain neither the language information nor the region information.

As described above, the browsing destination code 47 is the code information that contains the browsing destination information 46. An example of the browsing destination code 47 is a two-dimensional code that encodes the browsing destination information 46 generated in the URL form by the predetermined rule.

For example, the browsing destination code 47 is the two-dimensional code that contains the browsing destination information 46 as illustrated in FIG. 6.

The manual display destination setting information 48 is information in which a device to display the manual information is set in advance.

For example, as illustrated in FIG. 7, the administrator of the image forming apparatus MFP or the like sets and stores, in the manual display destination setting information 48, a set value indicative of a manual information display destination in advance.

In the manual display destination setting information 48 illustrated in FIG. 7, a set value "0" is set when the manual information display destination is "DISPLAY SCREEN OF IMAGE FORMING APPARATUS MFP", and a set value "1" is set when the manual information display destination is "DISPLAY SCREEN OF USER TERMINAL PC".

In the case where the set value "0" is set in the manual display destination setting information 48, manual information acquisition processing or the like is executed such that the manual information corresponding to the occurred event (the manual content) is displayed on the "DISPLAY SCREEN OF IMAGE FORMING APPARATUS MFP".

Meanwhile, in the case where the set value "1" is set in the manual display destination setting information 48, the manual information acquisition processing or the like is executed such that the manual information corresponding to the occurred event (the manual content) is displayed on the "DISPLAY SCREEN OF USER TERMINAL PC".

However, in the case where the manual information is not displayed on the display screen of the image forming apparatus MFP but is always displayed on the display screen of the information browsing device PC, the manual display destination setting information 48 may be omitted.

The content request 49 is information that is transmitted from the image forming apparatus MFP to the document management device SV, and is generated at the time of requesting transmission of the manual information corresponding to the occurred event (the manual content).

As illustrated in FIG. 7, the content request 49 contains the browsing destination information (URLDT) and further preferably contains transmission destination information (SVIPAD) and transmission source information (MFPIPAD).

For example, in the content request 49 illustrated in FIG. 7, the transmission destination information (SVIPAD) is set to the server connection destination information (SVIP900), the transmission source information (MFPIPAD) is set to the MFP connection destination information (IP101), and the browsing destination information (URLDT) is set to the browsing destination information URL111 illustrated in FIG. 6.

The document management device SV that has received the content request 49 transmits the selected manual information (the manual content) with the information set in the transmission source information (MFPIPAD) as the destination.

The received manual content information 50 is the received manual information (the manual content) and is information that is transmitted from the document management device SV as a response to the content request 49.

The received manual content information 50 in FIG. 7 contains the event information (EVID), a manual name (CNNA), and a manual content file (CNFL).

In the received manual content information 50 illustrated in FIG. 7, the event information is "EV02", the manual name is "FUSING PAPER JAM WORK", and the manual content file is "CNF201".

"FUSING PAPER JAM WORK" means the work for removing the jammed print paper at the time when the print paper is stopped in the transport path near the fusing device. As will be described below, the received manual content information 50 corresponds to selection content information 96 that is selected from the manual content information 93 in the document management device SV.

Configuration of Document Management Device (Management Server)

FIG. 3 is a block diagram of a configuration of the document management device (the management server) according to the embodiment of the present disclosure.

In FIG. 3, the document management device (SV) 2 according to the present disclosure mainly includes a controller 71, an operation acceptor 72, a display device 73, a communicator 74, a manual content request receiver 75, a manual content selector 76, a manual content transmitter 77, and the storage 90.

The controller 71 is a component that controls operation of each of the components such as the operation acceptor 72 and the display device 73, and is realized by a microcomputer including a CPU, ROM, RAM, an I/O controller, a timer, and the like. The CPU organically actuates various types of hardware on the basis of control programs that are stored in nonvolatile memory such as the ROM in advance, and implements a manual content transmission function and the like on the document management device SV.

The operation acceptor 72 is an input device for the administrator of the document management device SV to perform a predetermined input operation. For example, the operation acceptor 72 is a component that is used to input information such as characters and to select and input the function. Any of a keyboard, a mouse, a touchscreen, and the like is used as the operation acceptor 72.

Keys operated by the administrator include an action start key, a function selection key, a setting key, and the like.

The display device 73 is a component that displays the information, and displays required information for implementation of each of the functions, a result of the implementation of each of the functions, and the like to notify the administrator thereof. For example, an LCD, an organic EL display, or the like is used as the display device 73. In the case where a touchscreen is used as the operation acceptor 72, the display device 73 and the touchscreen are superimposed.

For example, the display device 73 displays setting information on the function implemented by the document management device SV, the browsing destination information 46 acquired from the image forming apparatus MFP, and the like by using text, a symbol, a graphic, an image, an icon, an animation, a moving image, and the like.

The communicator 74 is a component for the data communication with the image forming apparatus MFP and the information browsing device PC via the network 4. For example, the communicator 74 receives the content request that is transmitted from the image forming apparatus MFP or the information browsing device PC.

In addition, as the response to the content request, the communicator 74 transmits the selection content information corresponding to the occurred event to the image forming apparatus MFP or the information browsing device PC that has transmitted the content request.

As described above, any of the existing communication networks can be used as the network 4, and the communication form may be either the wired communication or the wireless communication.

Although there is a case where the only one image forming apparatus MFP can be connected to the single document management device SV, the plural image forming apparatuses MFP can be connected to the single document management device SV, and the single document management device SV may the manual information about the plural image forming apparatuses MFP.

The manual content request receiver 75 is a component that receives the content request transmitted from the image forming apparatus MFP or the information browsing device PC.

The manual content selector 76 is a component that selects the manual information requested by the received content request.

The received content request contains the browsing destination information. Accordingly, by using this browsing destination information 46, the manual information (the manual content) that is associated with the event occurred in the image forming apparatus identified by the browsing destination information 46 is selected from the manual content information 93 that is saved in the storage 90 of the document management device SV.

The selected manual information (the manual content) will be referred to as the selection content information 96.

In the case where the browsing destination information 46 contained in the content request is set as a part of the URL, the part of the URL corresponding to the browsing destination information 46 is checked to search for the manual information corresponding to the occurred event (the manual content).

The selection content information 96 at least contains the manual content file that corresponds to the occurred event. For example, in the case where the occurred event is "OUT OF TONER", a manual content file that contains a work content about replacement of the toner cartridge and is the manual information for solving "OUT OF TONER" is selected as the selection content information 96.

However, since a shape and a size of the toner cartridge, a storage position of the toner cartridge, the replacement work content thereof, and the like may vary by the model of the image forming apparatus MFP, the manual content file that corresponds to the model information contained in the browsing destination information 46 is selected from the manual content file about the replacement of the toner cartridge.

In the case where the manual content file about the replacement of the toner cartridge is saved in the storage 90 of the document management device SV for each of a large number of the languages, the manual content file that is described in the language of the language information contained in the browsing destination information 46 is selected.

Furthermore, there is a case where usage and an operation content of the software, which is currently used in the image forming apparatus MFP, vary by the version information of the software and the content described in the manual content file differs.

In the case where the manual content file, which corresponds to each piece of the version information of the software, is saved in the storage 90 of the document management device SV, the manual content file corresponding to the version number information contained in the browsing destination information is selected.

As illustrated in FIG. 9, which will be below, in the case where the manual content information 93 that is saved in the storage 90 of the document management device SV contains a large number of the manual content files associated with the event information, the model information, and the like, the following manual content file is selected as the selection content information 96 from the large number of the manual content files. The manual content file is associated with the event information, the model information, and the like that respectively match the event information, the model information, and the like in the browsing destination information contained in the received content request.

The manual content transmitter 77 is a component that transmits the selection content information 96, which is selected by the manual content selector 76, to the information browsing device PC or the image forming apparatus MFP.

In the case where the content request is transmitted from the image forming apparatus MFP, the selection content information 96 is transmitted to such an image forming apparatus MFP. Meanwhile, in the case where the content request is transmitted from the information browsing device PC, the selection content information 96 is transmitted to such an information browsing device PC.

The storage 90 is a component that stores the information and the program required to implement each of the functions of the document management device SV according to the present disclosure. A semiconductor storage element such as ROM, RAM, or flash memory, a storage device such as an HDD or an SSD, or another storage medium is used therefor. For example, the storage 90 stores server information 91, MFP information 92, manual content information 93, a received content request 94, received browsing destination information 95, the selection content information 96, and the like.

FIG. 8, FIG. 9, and FIG. 10 each illustrate explanatory tables of the information that is stored in the storage 90 of the document management device SV according to the embodiment.

The server information 91 is data that stores information unique to the document management device SV, and is set and stored in advance.

As illustrated in FIG. 8, the server information 91 contains: the server name (SVNA) used to identify the document management device SV; and the server connection destination information (SVIPAD).

Each of the server name (SVNA) and the server connection destination information (SVIPAD) is similar to the information that is contained in the server information 42 illustrated in FIG. 5.

For example, the server name (SVNA) is the name information (SV900) used to identify the document management device SV, and the server connection destination information (SVIPAD) is the information "SVIP900" used to connect to the document management device SV via the network.

The MFP information 92 is data that stores the information unique to the image forming apparatus MFP connectable to the document management device SV, and is set and stored in advance.

The MFP information 92 contains information that is used to identify and connect to the image forming apparatus MFP, and further contains authentication information for connection to the document management device SV.

The MFP information 92 in FIG. 8 contains the MFP device name (MFPNA), the MFP connection destination information (MFPIPAD), the connection ID (SVID), and the connection password (SVPW).

The MFP device name (MFPNA) is the name information used to identify the image forming apparatus MFP, and may be an ID number, a serial number, or the like. The MFP connection destination information (MFPIPAD) is information used to connect to the image forming apparatus MFP via the network. For example, the IP address is used as the MFP connection destination information (MFPIPAD).

The connection ID (SVID) and connection password (SVPW) are the information used for the general authentication processing.

The MFP information 92 in FIG. 8 indicates the information on the two image forming apparatuses (MFP101, MFP201) that can be connected to the document management device SV. For example, the MFP connection destination information for the image forming apparatus with the apparatus name of MFP101 is "IP101", the connection ID and the connection password at the time of connecting this image forming apparatus MFP101 to the document management device SV are SVID01 and SVPW01.

The manual content information 93 contains the manual content having the plural pieces of the manual information, each of which is associated with the event possibly occurred to the image forming apparatus MFP. Furthermore, the manual content information 93 contains a large volume of the manual information (the manual contents) as the manual content files containing the manual information that are classified by the model of the image forming apparatus MFP, the language and the version number information (the version information) of the software used in the image forming apparatus MFP, and the like. In other words, in the manual content information 93, the plural manual content files, each of which describes the predetermined manual information, are classified by the information such as the event information and the model information, and are stored in advance in the manner to be associated with the event information, the model information, and the like.

FIG. 9 includes explanatory tables of the manual content information 93 according to the embodiment.

As the manual content information 93 in FIG. 9, four pieces of the manual content information are presented. One of the pieces of the manual content information contains manual identification number (CNNO), the manual name (CNNA), the event information (EVID), the model information (KID), the language information (GID), the region information (TID), the version number information (VID), and the manual content file (CNFL).

The manual identification number (CNNO) is information used to identify the manual information (the manual content). The manual name (CNNA) is information that outlines the manual information, and indicates the name of the work that is performed in response to the occurred event herein.

In the manual content information 93 illustrated in FIG. 9, the event information (EVID) is information that corresponds to the event detection information (KEV) illustrated in FIG. 6, and the model information (KID), the language information (GID), the region information (TID), and the version number information (VID) are information respectively corresponding to the model information (KID), the language information (GID), the region information (TID), and the version number information (VID) contained in the browsing destination information 46 illustrated in FIG. 6. The manual content file (CNFL) contains the content of the manual information (the entity data of the manual) that is provided to the user, and contains the information such as the text, the symbol, the graphic, the still image, or the moving image.

For example, in the manual content information 93 illustrated in FIG. 9, the information on the manual identification number (CNNO) "CN001" is information on the work for clearing the paper jam at the time when the fed print paper is jammed, and contains the manual name (CNNA) of "FED PAPER JAM WORK", the event information (EVID) of "EV01", the model information (KID) of two models (MX101, MX500), the language information (GID) of "JAPANESE", the region information (TID) of "TOKYO", the version number information (VID) of "VER101", and the name of the manual content file (CNFL) is "CNF101".

Similarly, the information on the manual identification number (CNNO) "CN002" contains the manual name (CNNA) of "FED PAPER JAM WORK". However, since the three pieces (MX101, MX500, and MX700) of the model information (KID) are contained therein, it means that the information on the manual identification number (CNNO) "CN002" is the manual information that can correspond to the three models.

In the information on the manual identification number (CNNO) "CN002", since the language information (GID) is "JAPANESE, ENGLISH", the information is written in Japanese and English. In addition, since the region information (TID) is "TOKYO, LONDON", information unique to Tokyo and London is provided. Furthermore, since the version number information (VID) is "VER102", information that corresponds to the version information "VER102" of the software for the image forming apparatus MFP is provided.

However, the contents of the manual content information 93 are not limited to those pieces of the information, and another type of information may be added.
In addition, any of the information other than the event information (EVID), the model information (KID), the manual content file (CNFL) may not be provided.

By referring to the received browsing destination information that is contained in the received content request, the information that can match the received browsing destination information is selected as the selection content information 96, which will be described below, from the manual content information 93.

The received content request 94 is the content request that has been received, and contains, as illustrated in FIG. 9, the transmission destination information (SVIPAD), the transmission source information (MFPIPAD), and the browsing destination information (URLDT).
The received content request 94 corresponds to the content request 49 illustrated in FIG. 7.
The received browsing destination information 95 is information that is contained in the received content request, is information as illustrated in FIG. 10, for example, and corresponds to the browsing destination information 46 illustrated in FIG. 6.

As described above, the selection content information 96 is the information that is selected by the manual content selector 76, and is information as illustrated in FIG. 10, for example.
The selection content information 96 illustrated in FIG. 10 is information that is selected from the manual content information 93 in FIG. 9, and is information with the manual identification number (CNNO) "CN101".
The selection content information 96 illustrated in FIG. 10 contains the manual identification number, the model information, and the like. However, the selection content information 96 may only contain the manual name (CNNA), the event information (EVID), and the manual content file (CNFL), for example.

For example, the selection content information 96 is selected as follows. In the case where the browsing destination information (URLDT) that is contained in the received content request is "URL111" illustrated in FIG. 6, the manual content information 93 as illustrated in FIG. 9 is searched for, so as to find the manual content information that contains the information from the event information to the model information respectively corresponding to the information from the event detection information to the model information contained in this browsing destination information URL111.
In this case, for example, the event detection information in the browsing destination information URL111 is "EV02". Thus, the manual content information 93 that contains the event information matching this event detection information "EV02" is the information with the manual identification number (CNNO) "CN101".

In the manual content information 93 illustrated in FIG. 9, the manual content information, which contains the information from the event information to the model information matching the information in the browsing destination information URL111 illustrated in FIG. 6, is the information with the manual identification number (CNNO) "CN101". Thus, the information with the manual identification number (CNNO) "CN101" is selected as the selection content information 96.

Meanwhile, for example, in the case where the event detection information in the browsing destination information URL111, which is contained in the received content request, is "EV01", two pieces of the manual content information 93 in FIG. 9 contain the event information (EVID) that matches this event detection information "EV01", and are thus available. In these two pieces of the manual content information 93, the manual name is "FED PAPER JAM WORK", and the manual identification numbers are "CN001" and "CN002". However, in the case where the version number information in the browsing destination information URL111 is "VER101", the information with the manual identification number "CN001" that contains the same version number information is selected as the selection content information 96.

In other words, the manual content information that is associated with the version number information matching the version number information (the version information) of the software used in the image forming apparatus MFP is selected as the selection content information 96.

The manual content transmitter 77 described above transmits the selection content information 96 to the image forming apparatus MFP or the information browsing device PC that has transmitted the content request.

Configuration of Information Browsing Device (User Terminal)

Figure 4:
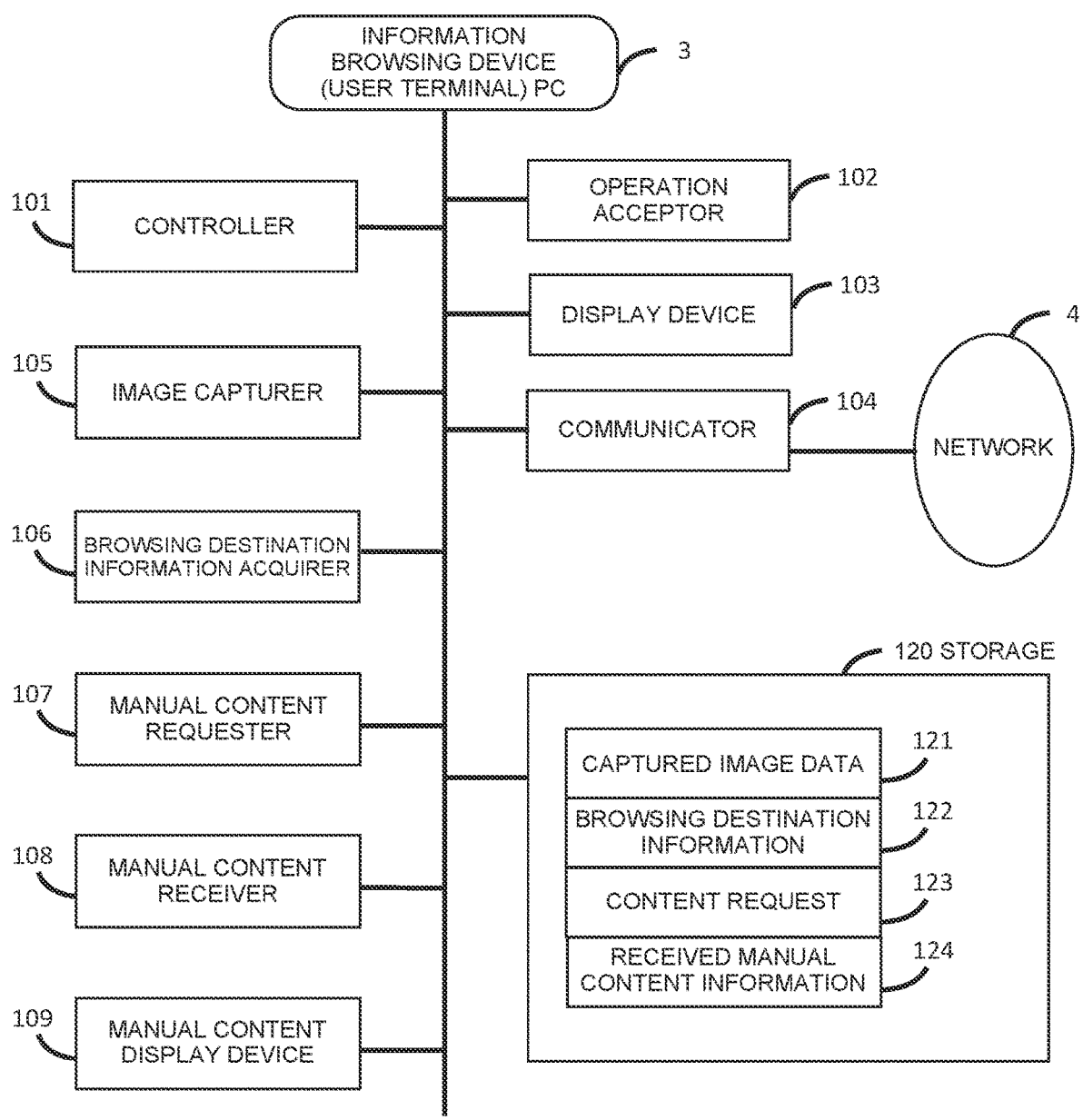
FIG. 4 is a block diagram of a configuration of an information browsing device according to the embodiment of the present disclosure.

FIG. 4 is a block diagram of a configuration of the information browsing device (the user terminal) according to the embodiment of the present disclosure.

In FIG. 4, the information browsing device (PC) 3 according to the present disclosure mainly includes a controller 101, an operation acceptor 102, a display device 103, a communicator 104, an image capturer 105, a browsing destination information acquirer 106, a manual content requester 107, a manual content receiver 108, a manual content display device 109, and a storage 120.

The controller 101 is a component that controls action of components such as the operation acceptor 102 and the display device 103, and is realized by a microcomputer that mainly includes CPU, ROM, RAM, an I/O controller, a timer, and the like.

The CPU organically actuates various types of hardware on the basis of control programs that are stored in nonvolatile memory such as the ROM in advance, and implements a browsing destination information acquisition function, a manual content display function, and the like on the information browsing device PC.

The operation acceptor 102 is an input device with which the user who carries the information browsing device PC performs a predetermined input operation. For example, the operation acceptor 102 is a component that is used to input information such as characters and to select and input the function. Any of a keyboard, a mouse, a touchscreen, and the like is used as the operation acceptor 102.

Keys that are operated by the user are an action start key, a function selection key, a setting key, and the like.

The display device 103 is a component that displays information, and displays required information for implementation of each of the functions, a result of the implementation of each of the functions, and the like to notify the user thereof. For example, an LCD, an organic EL display, or the like is used as the display device 103. In the case where a touchscreen is used as the operation acceptor 102, the display device 103 and the touchscreen are superimposed.

For example, the display device 103 displays the manual information (the manual content), which is acquired from the document management device SV, a server connection request screen, and the like by using text, a symbol, a graphic, an image, an icon, an animation, a moving image, and the like.

The communicator 104 is a component for the data communication with the image forming apparatus MFP and the document management device SV via the network 4. For example, the communicator 104 transmits the content request to the document management device SV, and receives the manual information (the manual content) that is transmitted from the document management device SV.

As described above, any of the existing communication networks can be used as the network 4, and the communication form may be either the wired communication or the wireless communication.

The image capturer 105 corresponds to a camera that is provided to the information browsing device PC.

For example, the image capturer 105 captures the two-dimensional code of the browsing destination information that is displayed on the display device 13 of the image forming apparatus MFP.

The two-dimensional code of the browsing destination information corresponds to the browsing destination code 47.

When the user who carries the information browsing device PC captures an image of the browsing destination code 47 that is displayed on the display device 13 of the image forming apparatus MFP, image data of the browsing destination code 47 is acquired and stored as captured image data 121 in the storage 120.

The browsing destination information acquirer 106 is a component that acquires the browsing destination information from the captured two-dimensional code (browsing destination code).

In the case where the browsing destination code 47 is the two-dimensional code, the two-dimensional code is decoded from the stored and captured image data 121. Then, browsing destination information 122 contained in the two-dimensional code is acquired and stored in the storage 120.

In the case where the browsing destination information is in the URL form, the browsing destination information 122 in the URL form is acquired. Furthermore, the event detection information as illustrated in FIG. 6, and the like can be acquired from the browsing destination information 122 in the URL form.

The manual content requester 107 is a component that requests the document management device SV to transmit the manual information corresponding to the occurred event to the information browsing device PC.

The manual content requester 107 generates a content request 123 that contains the acquired browsing destination information 122, and transmits the generated content request 123 to the document management device SV that saves the manual information corresponding to the occurred event.

The manual content requester 107 corresponds to the manual content requester 30 in the image forming apparatus MFP, and the content request 123 is information that corresponds to the above-described content request 49 in FIG. 7.

However, the connection destination information of the information browsing device PC (for example, the IP address of the PC) is set as transmission source information of the content request to be transmitted from the information browsing device PC.

For example, the content request 123 contains the browsing destination information as illustrated in FIG. 6. However, in the case where the document management device SV can decode the two-dimensional code, the content request 123 may contain the captured image data 121 of the browsing destination code itself when being transmitted.

The manual content receiver 108 is a component that receives the selection content information 96, which is transmitted from the document management device SV, as a response to the content request. The manual content receiver 108 corresponds to the manual content receiver 31 in the image forming apparatus MFP.

The received selection content information 96 is stored as received manual content information 124 in the storage 120.

The manual content display device 109 is a component that displays the received manual content information 124 on the display device 103 of the information browsing device PC. The received manual content information 124 is the manual information that corresponds to the occurred event, and is the manual content information that is transmitted from the document management device SV.

For example, in the case where the received selection content information 96 is the manual information that corresponds to the occurred event "FED PAPER JAM", the information on the work for removing the stopped print paper in the middle of the transport is displayed on the display device 103 by using text, a graphic, an image, a moving image, and the like.

Meanwhile, in the case where the received selection content information 96 is the manual information that corresponds to the occurred event "OUT OF TONER", and information on a contact for a toner cartridge order is provided in the manual information in advance, a display screen for placement of a toner cartridge order may be displayed via the network, in addition to the information on the toner cartridge replacement work and the information on the toner cartridge supplier.

The manual information that corresponds to the occurred event is displayed on the display screen of the information browsing device PC. Thus, the user who carries the information browsing device PC moves toward the image forming apparatus MFP and can perform the paper jam removal work on the image forming apparatus MFP while checking the manual content that corresponds to "FED PAPER JAM WORK" and is displayed on the display screen of the information browsing device PC.

In addition, the content of "FED PAPER JAM WORK" is displayed not on the display device 13 of the image forming apparatus MFP but on the display screen in the display device 103 of the information browsing device PC. Thus, while browsing the manual content of "FED PAPER JAM WORK", the user checks other types of the information that are displayed on the display device 13 of the image forming apparatus MFP, and can select a predetermined displayed item. As a result, an operation burden on the user can be reduced, and "FED PAPER JAM WORK" can further promptly be performed.

The storage 120 is a component that stores the information and the program required to implement each of the functions of the information browsing device PC according to the present disclosure. A semiconductor storage element such as ROM, RAM, or flash memory, a storage device such as an HDD or an SSD, or another storage medium is used therefor. For example, the storage 120 stores the captured image data 121, the browsing destination information 122, the content request 123, the received manual content information 124, and the like.

As described above, the captured image data 121 is the image data that is captured by the image capturer 105.

As described above, the browsing destination information 122 is the information that is acquired from the captured image data 121, and corresponds to the browsing destination information 46 illustrated in FIG. 6, for example.

As described above, the content request 123 is the information that is generated by the manual content requester 107.

As described above, the received manual content information 124 is the selection content information 96 that is transmitted, as the response to the content request, from the document management device SV.

Manual Information Acquisition Processing in Image Forming Apparatus A description will herein be made on processing to detect the occurred event (the action, the operation, the failure, or the like) of the image forming apparatus MFP and acquire the manual information that corresponds to the detected event.

In the case where the manual information that corresponds to the occurred event is already saved in the image forming apparatus MFP, such manual information is displayed on the display screen of the image forming apparatus.

On the other hand, in the case where the manual information that corresponds to the occurred event is not saved in the image forming apparatus MFP, such manual information is acquired from the document management device SV, or the information for acquiring the manual information from the document management device SV (the browsing destination information or the browsing destination code) is displayed on the display screen of the image forming apparatus MFP.

In particular, in Example 1 below, the information (the browsing destination information or the browsing destination code) that is used to acquire the manual information from the document management device SV is displayed on the display screen of the image forming apparatus MFP. Then, the image of the browsing destination code is captured by using the camera of the information browsing device PC, and the manual information itself is displayed on the display screen of the information browsing device PC, which differs from the image forming apparatus MFP.

In Example 2, the browsing destination information, which is the information for acquiring the manual information from the document management device SV, is transmitted from the image forming apparatus MFP to the information browsing device PC, the manual information is acquired from the document management device SV by using the browsing destination information that the information browsing device PC has received, and the manual information is displayed on the display screen of the information browsing device PC.

Example 1 of Manual Information Acquisition Processing

Figure 11:
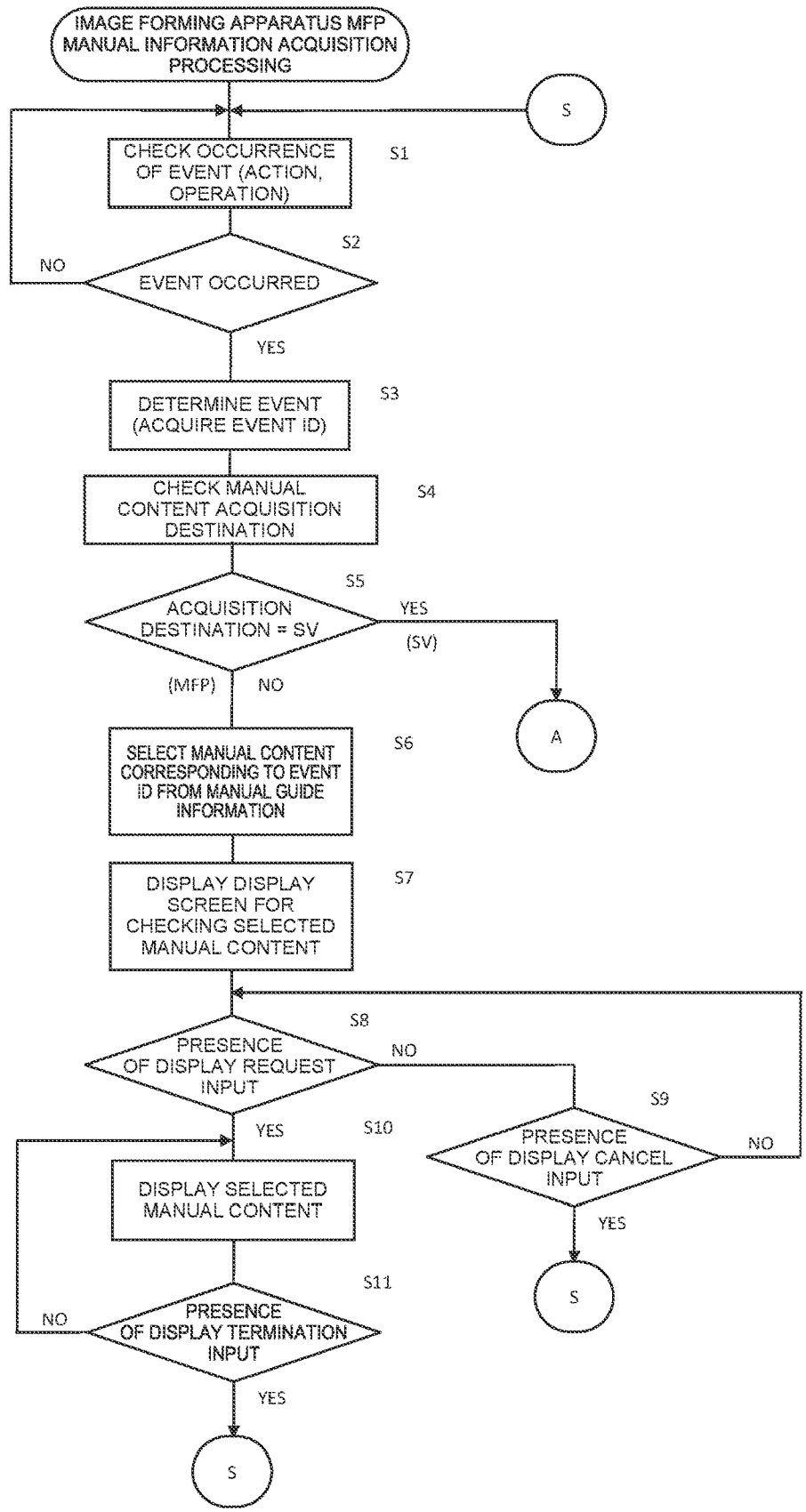
FIG. 11 is flowchart of manual information acquisition processing in the image forming apparatus according to the embodiment of the present disclosure.
Figure 12:
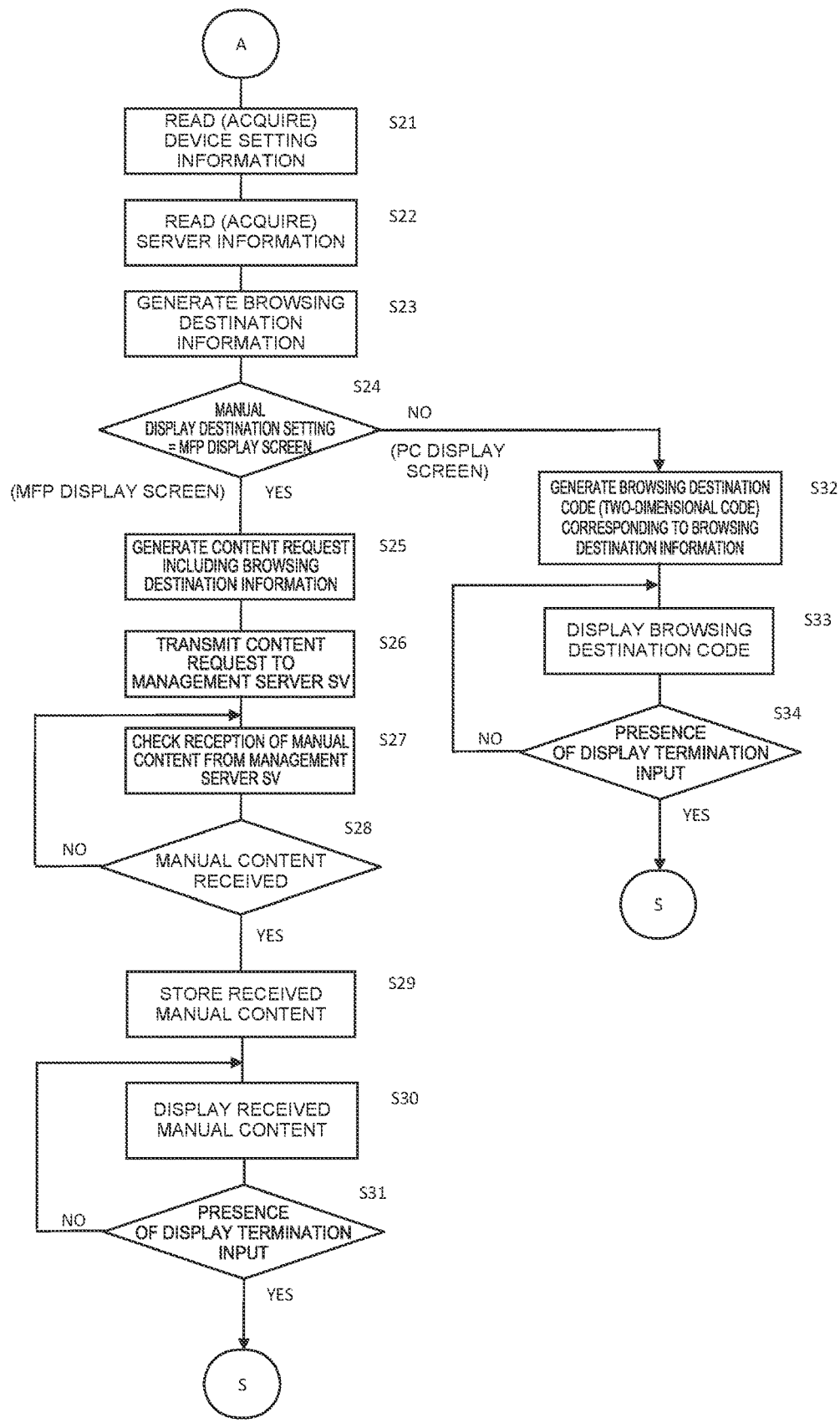
FIG. 12 is flowchart of the manual information acquisition processing in the image forming apparatus according to the embodiment of the present disclosure.

FIG. 11 and FIG. 12 illustrate a flowchart of the manual information acquisition processing in the image forming apparatus according to the embodiment.

In step S1 illustrated in FIG. 11, the event detector 21 checks whether the predetermined event has occurred in the image forming apparatus MFP.

For example, the action detector 22 checks whether the toner in the toner cartridge has run out or whether the paper has been jammed in the print paper transport path.

In addition, the operation detector 23 checks whether the operation to start the toner cartridge replacement work has been performed.

If the occurrence of the event is detected in step S2, the processing proceeds to step S3. If not, the processing returns to step S1.

In step S3, the occurred event determination device 24 determines the occurred event by using the event correspondence information 44, and acquires the event information (the event ID: EVID) that corresponds to the occurred event. For example, in the case where the fed paper print is jammed in the transport path, the event information (the event ID) EV01, which corresponds to the occurred event (EVNA) "FED PAPER JAM", is acquired from the event correspondence information 44 in FIG. 6 and stored as the event detection information 45 in the storage 40.

In step S4, the manual content acquisition destination is checked.

For example, in the case where the event correspondence information 44 as illustrated in FIG. 6 is stored in advance, the manual save destination (STR) that corresponds to the acquired event ID (the event detection information 45) is checked.

In the case where the information on the image forming apparatus MFP is stored in the manual save destination (STR) that correspond to the acquired event ID (the event detection information 45), it is determined that the manual content acquisition destination is the image forming apparatus MFP.

Meanwhile, in the case where the information on the document management device SV is saved in the manual save destination (STR) that corresponds to the acquired event ID, it is determined that the manual content acquisition destination is the document management device SV.

In the case where the acquired event ID in the event correspondence information 44 illustrated in FIG. 6 is EV01, the manual save destination (STR) that corresponds to the event ID is MFP101. Thus, it is determined that the manual content acquisition destination is the image forming apparatus MFP.

Such a case means that the manual content corresponding to the occurred event "FED PAPER JAM" is saved in the storage 40 of the image forming apparatus (MFP101).

Meanwhile, in the case where the acquired event ID in the event correspondence information 44 illustrated in FIG. 6 is EV03, the manual save destination (STR) that corresponds to the event ID is SV900. Thus, it is determined that the manual content acquisition destination is the document management device SV.

Such a case means that the manual content corresponding to the occurred event "OUT OF TONER" is saved in the storage 90 of the document management device (SV900).

In step S5, if the manual content acquisition destination is the document management device (the management server) SV, the processing proceeds to step S21 in FIG. 12. If the manual content acquisition destination is the image forming apparatus MFP, the processing proceeds to step S6.

In step S6, the manual content that corresponds to the acquired event information ID is selected from the manual guide information 43 saved in the storage 40 of the image forming apparatus MFP.

In step S7, a display screen (a check request screen: G1) for checking the selected manual content is displayed.

Figure 17:
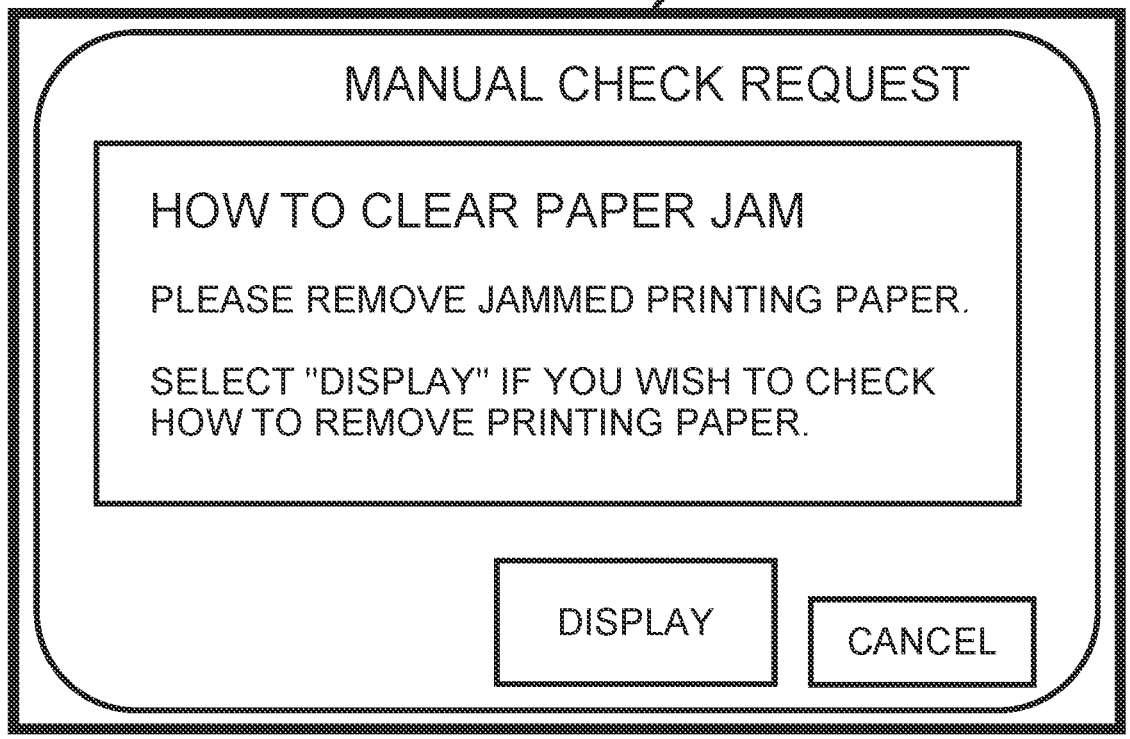
FIG. 17 is an explanatory view of a display screen for checking a manual content in the image forming apparatus according to the embodiment of the present disclosure.

For example, the check request screen G1 as illustrated in FIG. 17 is displayed.

The check request screen G1 in FIG. 17 is a screen that is displayed when the print paper is jammed, and displays that the print paper is jammed and whether to check a manual of a method for removing the jammed print paper.

However, the check request screen G1 in FIG. 17 is merely one example, and the displayed content is not limited the content thereof.

The user of the image forming apparatus MFP looks at this display screen G1 and determines whether to browse the manual content. When wishing to browse the manual content, the user selects and inputs a display area "DISPLAY" in the display screen. When not wishing to browse the manual content, the user selects and inputs a display area "CANCEL" in the display screen.

If the display request (the display area "DISPLAY") is selected and inputs in step S8, the processing proceeds to step S10. If not, the processing proceeds to step S9.

If not displaying (the display area "CANCEL") is selected and inputs in step S9, the check request screen G1 in FIG. 17 is closed, and the processing returns to step S1. If not, the processing returns to step S8.

In step S10, the selected manual content is displayed on the display device 13 of the image forming apparatus MFP. The user of the image forming apparatus can check the manual information, which corresponds to the occurred event, by looking at this manual content. For example, the user can acquire the information on the method for removing the jammed print paper.

After step S6, the processing may proceed to step S10 without displaying the check request screen G1.

In this case, the user of the image forming apparatus does not have to perform a special input operation, and the selected manual content is displayed on the display device 13 of the image forming apparatus. Thus, there is no burden on the user to display the manual information that corresponds to the occurred event.

In the case where an input operation that means termination of the predetermined display is performed in step S11, the display of the manual content is terminated, and the processing returns to step S1. If not, the processing returns to step S10.

With the processing described so far, in the case where a person who can perform the work to handle the occurred event, such as the administrator of the image forming apparatus MFP, is located near the image forming apparatus, such a person can promptly perform the work to handle the event by checking the check request screen G1 that is displayed on the image forming apparatus MFP.

In addition, in the case where the predetermined event occurs in the image forming apparatus, the check request screen G1 is displayed. Thus, when the user wishes to look at the manual information that corresponds to the occurred event, the manual information is displayed by selecting and inputting the display request. As a result, it is possible to reduce the input burden on the user for displaying the manual information corresponding to the occurred event.

If the manual content acquisition destination is the document management device (the management server) SV in step S5 described above, the processing in step S21 onward in FIG. 12, which will be described below, is executed.

In step S21 illustrated in FIG. 12, the device setting information 41 that is stored in the storage 40 of the image forming apparatus MFP is retrieved. For example, the device setting information 41 as illustrated in FIG. 5 is retrieved.

In step S22, the server information 42 that is stored in the storage 40 of the image forming apparatus MFP is retrieved. For example, the server information 42 as illustrated in FIG. 5 is retrieved.

In step S23, the browsing destination information generator 25 generates the browsing destination information 46. Here, the browsing destination information 46 is generated by using the event detection information 45, the retrieved device setting information 41, and the server information 42. For example, URL111 of the browsing destination information 46 illustrated in FIG. 6 is generated by using the device setting information 41 and the server information 42 in FIG. 5 and the event detection information 45 in FIG. 6.

As described above, the browsing destination information 46 may be information in the URL form that contains the event detection information and the like.

In step S24, it is checked whether the manual display destination setting information 48 that is stored in the storage 40 of the image forming apparatus MFP is set to "MFP DISPLAY SCREEN" or "USER TERMINAL PC DISPLAY SCREEN". If the manual display destination setting information 48 is set to "MFP DISPLAY SCREEN", the processing proceeds to step S25. If the manual display destination setting information 48 is set to "USER TERMINAL PC DISPLAY SCREEN", the processing proceeds to step S32.

However, in the case of a design specification that the manual display destination setting information 48 is not stored in the storage 40 of the image forming apparatus MFP and the manual information is always displayed on the USER TERMINAL PC DISPLAY SCREEN, the processing proceeds to step S32 after step S23.

In step S25, the manual content requester 30 generates the content request 49 that contains the browsing destination information 46 described above.

In step S26, the content request is transmitted to the management server SV.

In step S27, it is determined whether the manual content that is transmitted from the management server SV is received.

In step S28, if the manual content is received from the management server SV, the processing proceeds to step S29. If not, the processing returns to step S27.

In step S29, the received manual content is stored in the storage 40.

In step S30, the received manual content is displayed on the display device 13. However, before displaying the manual content, the check request screen in FIG. 17 may be displayed as in step S7 described above.

In the case where the manual content is displayed, the manual content may be displayed by terminating the display screen that has been displayed immediately before. For example, the function selection screen, a set item setting screen, or the like is displayed immediately before, the display screen may be segmented into any of these display screens displayed immediately before and the manual content screen. Alternatively, the display screen may be switched between the display screen that has been displayed immediately before and the manual content screen by a predetermined input operation.

If an input operation meaning predetermined display termination is performed in step S31, the display of the manual content is terminated, and the processing returns to step S1. If not, the processing returns to step S30.

In step S32, the browsing destination code (the two-dimensional code) that corresponds to the generated browsing destination information is generated. Here, since the manual display destination setting information 48 is set to "USER TERMINAL PC DISPLAY SCREEN", the browsing destination code (the two-dimensional code) is generated to connect the user terminal PC to the document management device SV and acquire the manual content.

In step S33, the browsing destination code is displayed on the display device 13 of the image forming apparatus MFP. For example, a browsing request screen G2 that contains the browsing destination code as illustrated in FIG. 18 is displayed on the display device 13.

This browsing request screen G2 is a display screen on which browsing of the manual information (the manual content), which is saved in the document management device SV, is requested.

On the browsing request screen G2 in FIG. 18, an explanation about a method for clearing the paper jam, the browsing destination code, and the URL of the browsing destination information are displayed.

The user who is located near the image forming apparatus MFP looks at this browsing request screen G2 and captures the browsing destination code (the two-dimensional code) by the user's own information browsing device PC. In this way, the browsing destination information can be acquired from the browsing destination code, and the information browsing device PC can thereby be connected to the document management device SV.

Alternatively, in the case where the information browsing device PC has a character recognition function, the browsing destination information may be acquired by capturing an image of the character string of the displayed URL and subjecting such an image to the character recognition. In this way, the information browsing device PC may be connected to the document management device SV.

In the case where the information browsing device PC does not have a function to capture the two-dimensional code, the information browsing device PC may be connected to the document management device SV by inputting the character string of the displayed URL.

Figure 16:
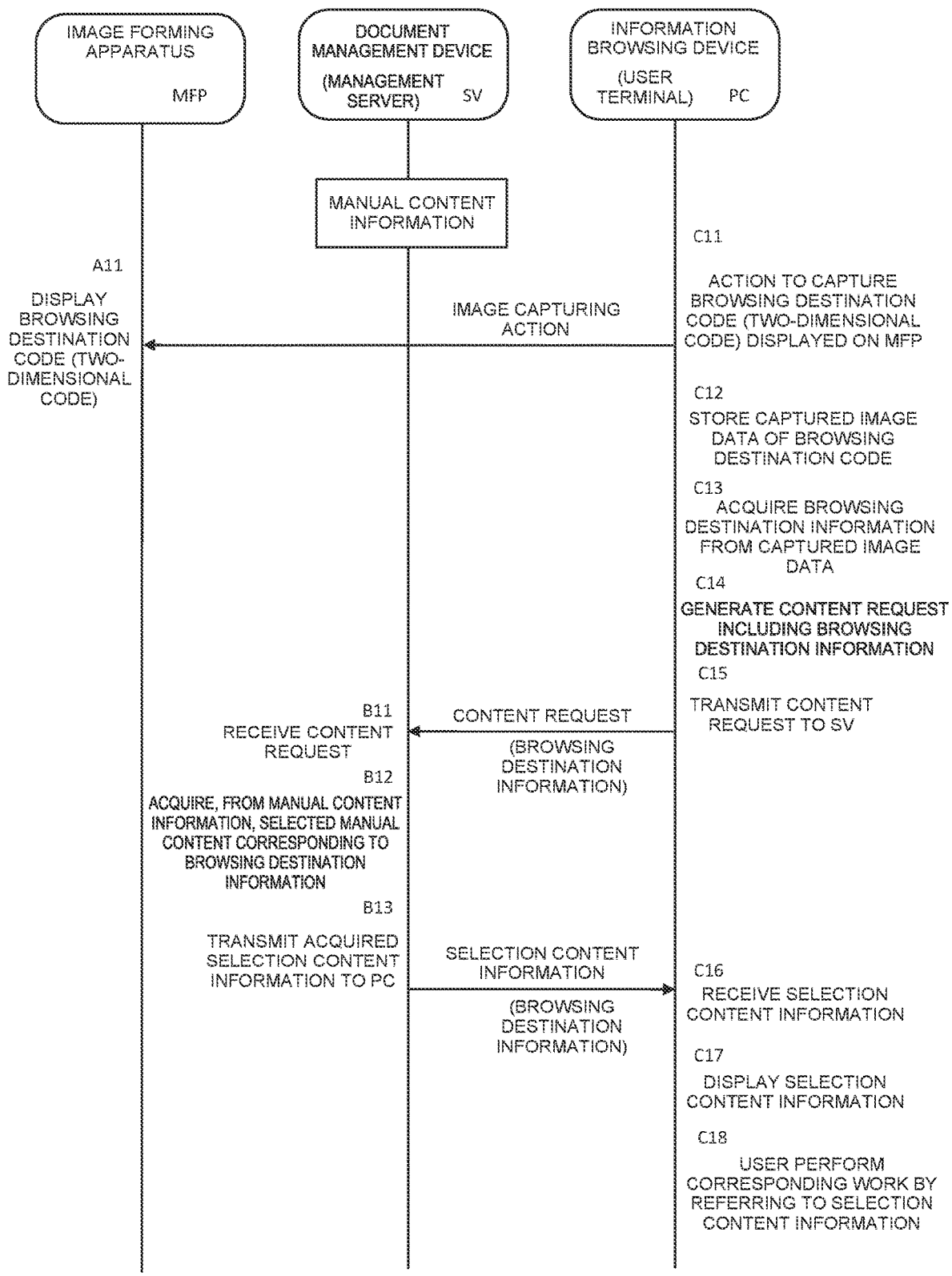
FIG. 16 illustrates a communication sequence of the manual information acquisition and display processing using displayed browsing destination information according to the embodiment of the present disclosure.

As illustrated in FIG. 16, which will be described below, by capturing the browsing destination code (the two-dimensional code) and connecting to the document management device SV, the content request is transmitted to the document management device SV, and the selected content is transmitted to the information browsing device PC. Thus, the manual information that corresponds to the occurred event can be browsed on the information browsing device PC.

If the case where the input operation meaning the predetermined display termination is performed in step S34, the display of the browsing request screen G2 is terminated, and the processing returns to step S1. If not, the processing returns to step S33.

With the processing described so far, a person who is located near the image forming apparatus MFP and carries the information browsing device PC, such as the administrator or the user of the image forming apparatus MFP, captures the browsing destination code (the two-dimensional code), which is displayed on the display device 13 of the image forming apparatus MFP, by using the information browsing device PC, the information browsing device PC can easily be connected to the document management device SV.

In addition, since the manual information that corresponds to the occurred event can be displayed on the terminal PC carried by the person, the person can further promptly perform the work that corresponds to the event for the image forming apparatus MFP without looking at the screen of the image forming apparatus MFP while carrying the PC.

Furthermore, in the case where the predetermined event occurs in the image forming apparatus, the browsing request screen G2 is automatically displayed. Thus, when the user of the image forming apparatus MFP wishes to look at the manual information that corresponds to the occurred event, the manual information is displayed on the information browsing device PC carried by the user only by capturing the displayed browsing destination code (the two-dimensional code). As a result, it is possible to reduce the input burden on the user to display the manual information that corresponds to the occurred event.

Example 2 of Manual Information Acquisition Processing

Figure 13:
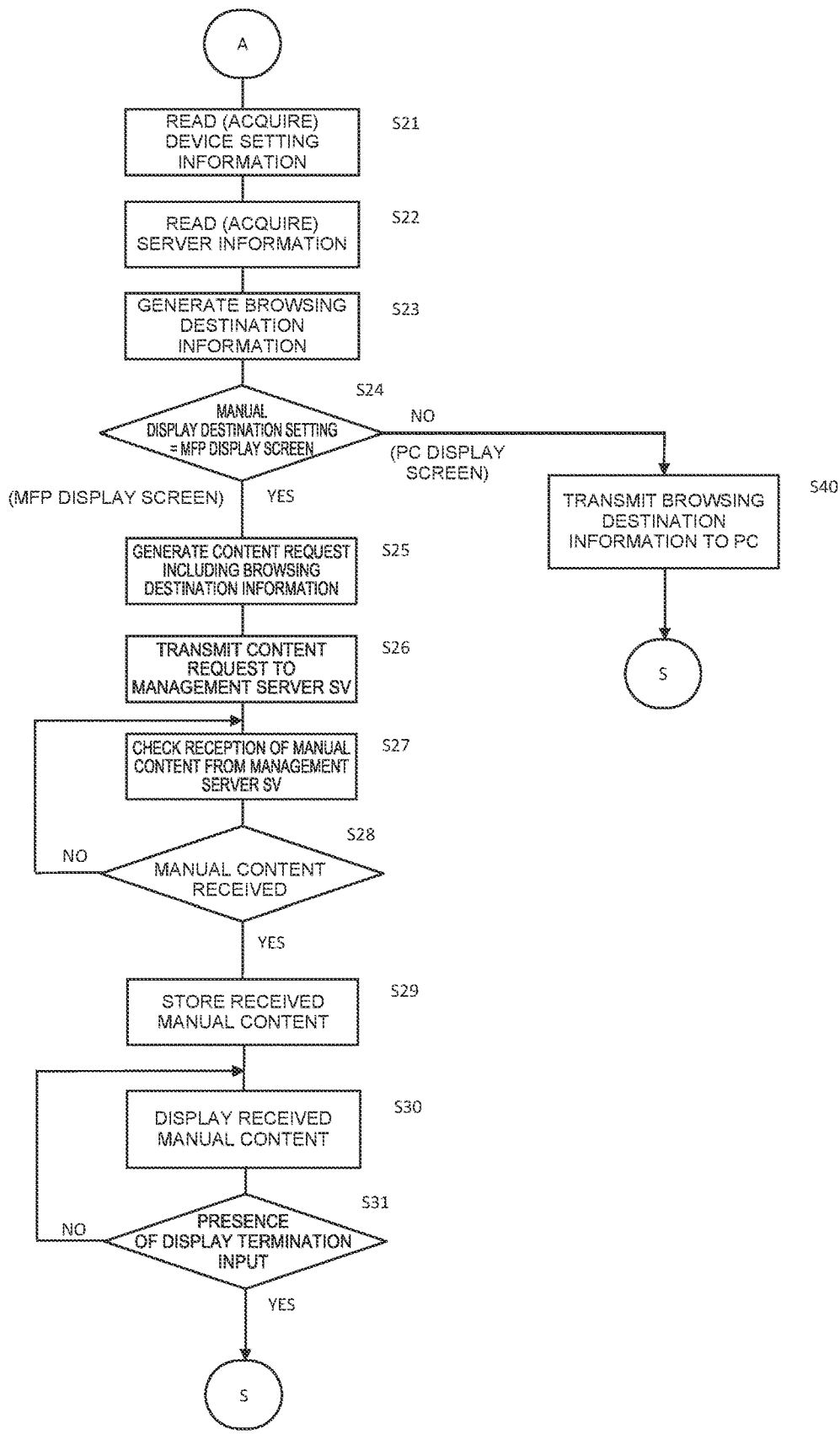
FIG. 13 is flowchart of the manual information acquisition processing in the image forming apparatus according to the embodiment of the present disclosure.

FIG. 13 illustrates a flowchart of the manual information acquisition processing in the image forming apparatus according to the embodiment.

In the flowchart illustrated in FIG. 12, the browsing destination code (the two-dimensional code) that corresponds to the browsing destination information is generated, and such a browsing destination code is displayed. Meanwhile, the flowchart illustrated FIG. 13 differs in a point that the browsing destination information is transmitted to the information browsing device (the user terminal) PC.

In this Example, the information used to connect to the information browsing device PC is preferably stored in advance in the storage 40 of the image forming apparatus MFP. For example, the apparatus name, which is used to identify the information browsing device PC, and the IP address, which is assigned to the information browsing device PC, are stored in advance.

In the flowchart illustrated in FIG. 13, the same processing as that in step S21 to step S31 of the flowchart in FIG. 12 is executed.

However, in step S24 illustrated in FIG. 13, if the manual display destination setting information 48 stored in the storage 40 of the image forming apparatus MFP is "USER TERMINAL PC DISPLAY SCREEN", the processing proceeds to step S40.

In step S40 illustrated in FIG. 13, the browsing destination information is transmitted to the information browsing device PC, and the processing returns to step S1 in FIG. 11. In the case where the image forming apparatus MFP stores the many information browsing devices PC, a list of the stored information browsing devices PC is displayed on the display device 13, and the user selects and inputs the user terminal PC, to which the browsing destination information is transmitted.

Figure 14:
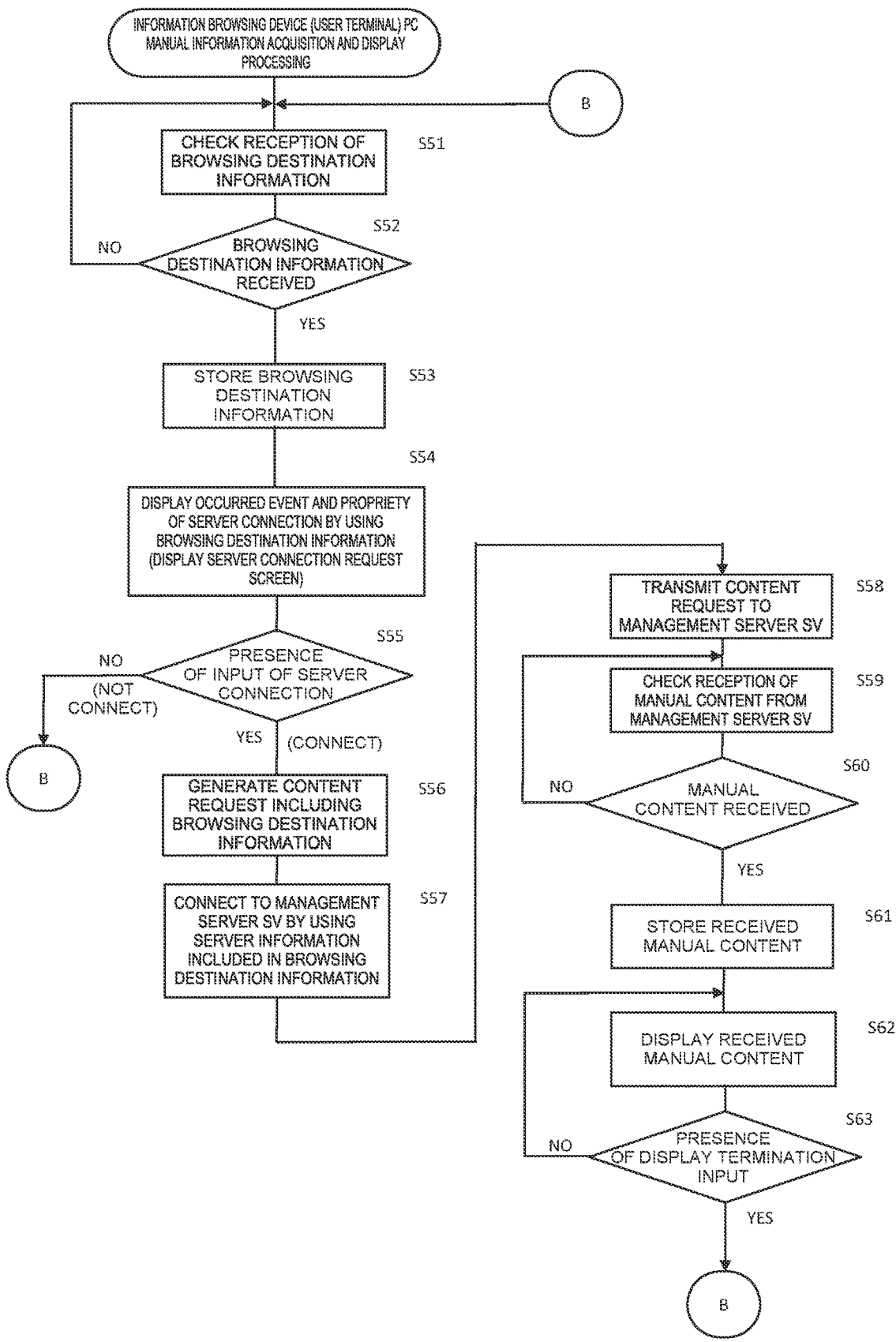
FIG. 14 is flowchart of manual information acquisition and display processing in the information browsing device according to the embodiment of the present disclosure.

For example, by executing manual information acquisition and display processing, which is illustrated in FIG. 14 and will be described below, the manual information that corresponds to the occurred event (the manual content) can be displayed on the information browsing device PC that has received the browsing destination information.

Manual Information Acquisition and Display Processing in Information Browsing Device FIG. 14 is flowchart of the manual information acquisition and display processing in the information browsing device according to the embodiment.

In step S51 illustrated in FIG. 14, it is determined whether the browsing destination information is received.

In step S52, if the browsing destination information is received, the processing proceeds to step S53. If not, the processing returns to step S51.

In step S53, the received browsing destination information 122 is stored in the storage 120.

In step S54, the server connection request screen is displayed on the display device 103 of the information browsing device PC by using the browsing destination information 122.

The server connection request screen is a display screen for checking the manual content in the information browsing device PC, and displays the information on the occurred event and information used to select whether to connect to the management server SV.

Figure 19:
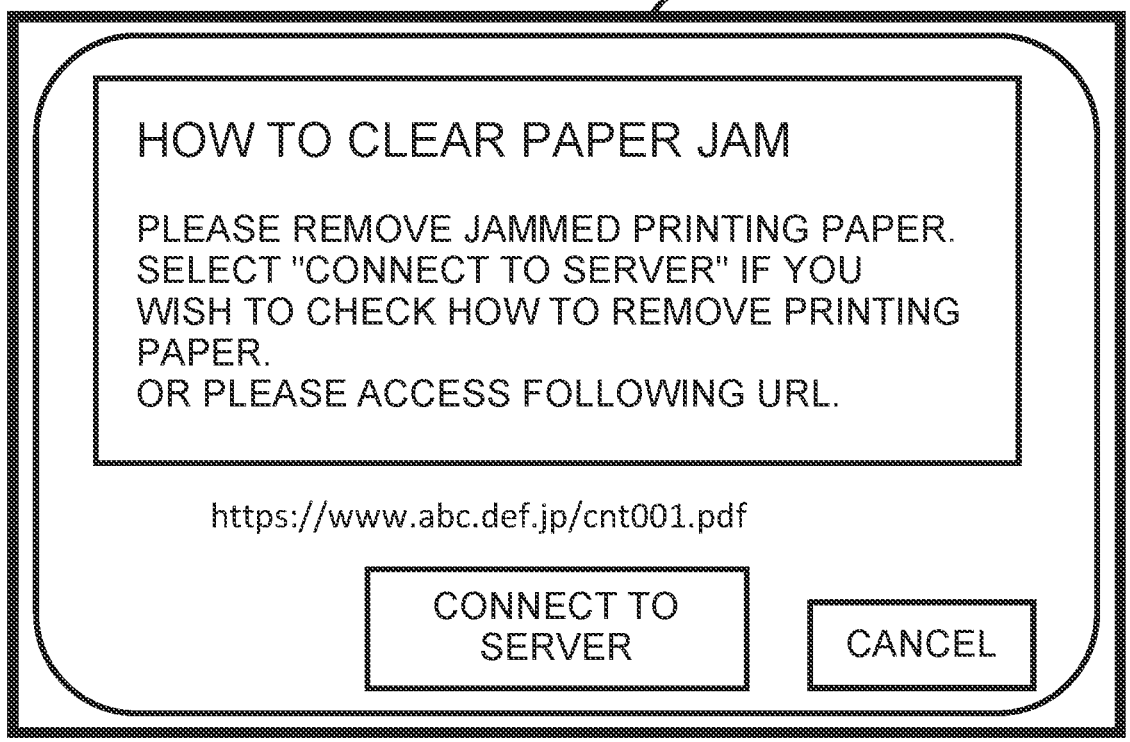
FIG. 19 is an explanatory view of a display screen for checking a manual content in the information browsing device according to the embodiment of the present disclosure.

FIG. 19 is an explanatory view of the display screen for checking the manual content (the server connection request screen: G3) according to the embodiment.

The server connection request screen G3 in FIG. 19 displays: a similar explanation on "HOW TO CLEAR PAPER JAM" to that in FIG. 18; the browsing destination information 122 in the URL form; a display area of "CONNECT TO SERVER" that is selected for the connection to the management server SV; and a display area of "CANCEL" that is selected when the connection is not desired.

The user of the information browsing device PC looks at this screen G3 and selects whether to connect the information browsing device PC to the management server SV.

When wishing to connect the information browsing device PC to the management server SV, the user selects and inputs the display area of "CONNECT TO SERVER". When not wishing, the user the user selects and inputs the display area of "CANCEL".

If the display area of "CONNECT TO SERVER" is selected and input in step S55, the processing proceeds to step S56. If not, that is, if the display area of "CANCEL" is selected and input, the server connection request screen G3 is closed, and the processing returns to step S51.

In step S56, the content request that contains the received browsing destination information 122 is generated.

In step S57, the server information that is contained in the received browsing destination information 122 is used for the connection to the management server SV.

Thereafter, the same processing as that in step S26 to S31 in FIG. 12 is executed. In step S58, similar to step S26, the content request is transmitted to the management server SV.

In step S59, it is checked whether the manual content transmitted from the management server SV is received.

If the manual content is received from the management server SV in step S60, the processing proceeds to step S61. If not, the processing returns to step S59.

In step S61, the received manual content is stored in the storage 120 of the PC.

In step S62, the received manual content is displayed on the display device 103 of the PC.

If the input operation meaning the predetermined display termination is performed in step S63, the display of the manual content is terminated, and the processing returns to step S51. If not, the processing returns to step S62.

With the processing described so far, even when not being present near the image forming apparatus MFP, the person who carries the information browsing device PC, such as the administrator or the user of the image forming apparatus MFP, can easily acknowledge the occurrence of the predetermined event, such as the print paper jam or running out of the toner, by checking the screen (the server connection request screen G3) that is displayed on the information browsing device PC by using the received browsing destination information. In this way, such a person can perform the predetermined input operation for the connection to the document management device SV.

In addition, the manual information that corresponds to the occurred event can be displayed on the user terminal PC carried by himself/herself. Therefore, the user can further promptly perform the work that corresponds to the event for the image forming apparatus MFP while carrying the PC without carrying the user terminal PC, walking toward the image forming apparatus MFP, and looking at the screen of the image forming apparatus MFP.

Figure 15:
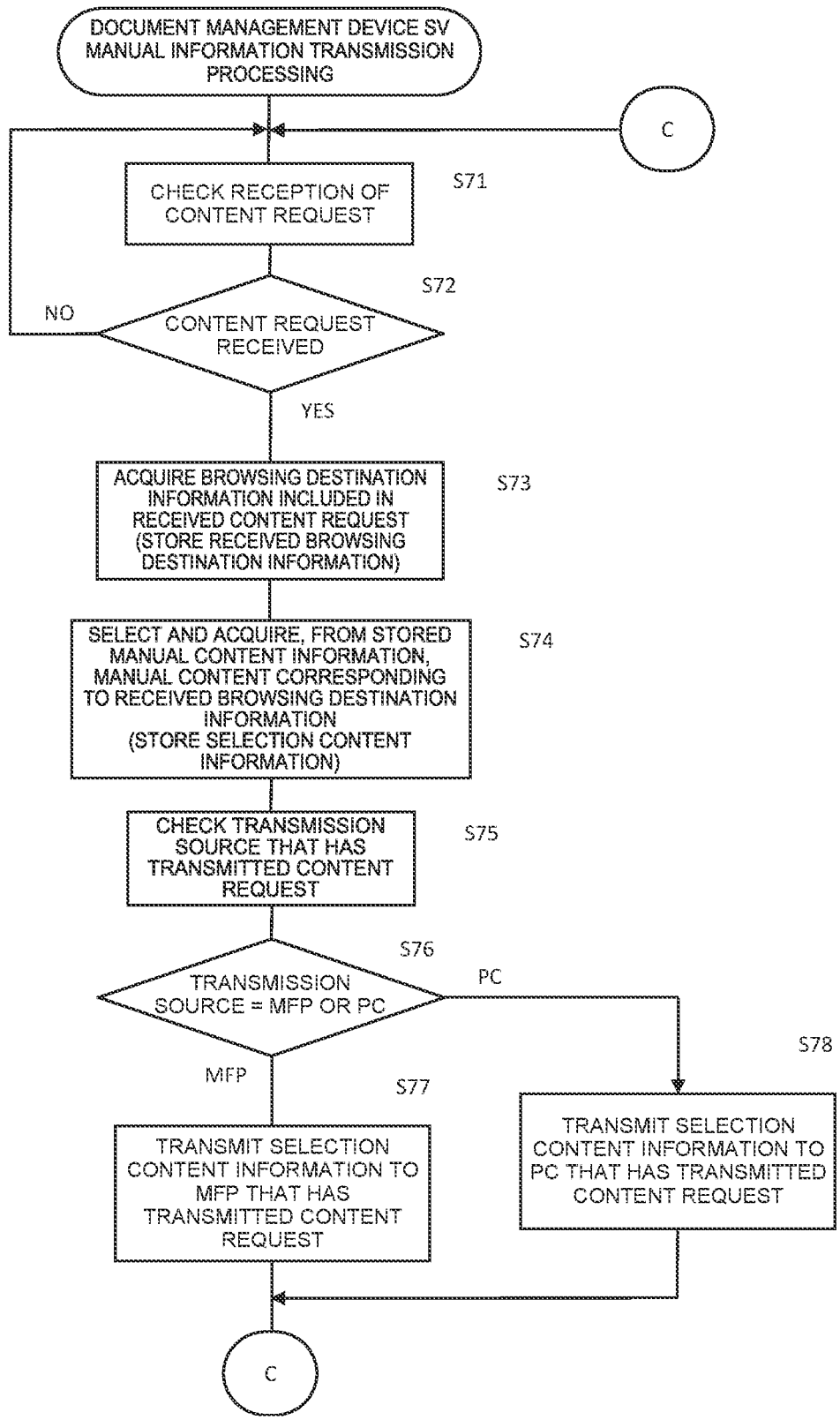
FIG. 15 is flowchart of manual information transmission processing in the document management device according to the embodiment of the present disclosure.

Manual Information Transmission Processing in Document Management Device FIG. 15 illustrates a flowchart of manual information transmission processing in the document management device according to the embodiment.

In step S71 illustrated in FIG. 15, the reception of the content request is checked. As described above, the content request is transmitted from the image forming apparatus MFP, or the content request is transmitted from the information browsing device PC. If the content request is received in step S72, the processing proceeds to step S73. If not, the processing returns to step S71.

In step S73, the browsing destination information that is contained in the received content request is acquired and stored as the received browsing destination information 95.

In step S74, the manual content that corresponds to the received browsing destination information 95 is selected from the manual content information 93 that is stored in the storage 90 of the document management device SV, and is stored as the selection content information 96.

As described above, the manual content that matches the event detection information and the like contained in the received browsing destination information 95 is searched from the plural manual contents that are stored in the manual content information 93, and is stored as the selection content information 96.

In step S75, the transmission source that has transmitted the content request is checked by using the transmission source information in the content request.

It is assumed that the transmission source is either the image forming apparatus MFP or the information browsing device PC.

In step S76, if the transmission source is the image forming apparatus MFP, the processing proceeds to step S77. If the transmission source is the information browsing device PC, the processing proceeds to step S78.

In step S77, the selection content information 96 is transmitted to the image forming apparatus MFP that has transmitted the content request, and the processing returns to step S71.

In step S78, the selection content information 96 is transmitted to the information browsing device PC that has transmitted to the content request, and the processing returns to step S71.

As described above, the manual information that corresponds to the occurred event (the manual content) is selected in the document management device SV, and is transmitted to the image forming apparatus MFP or the information browsing device PC that has transmitted the content request.

Example of Manual Information Acquisition and Display Processing Using Browsing Destination Information Displayed on Image Forming Apparatus FIG. 16 illustrates a communication sequence of the manual information acquisition and display processing using the browsing destination information that is displayed on the image forming apparatus MFP according to the embodiment.

The communication sequence in FIG. 16 is a communication sequence that corresponds to Example 1 of the manual information acquisition processing in the image forming apparatus. A manual information browsing request (the content request) is made from the information browsing device PC to the document management device SV, and the manual information that corresponds to the occurred event (the manual content) is displayed on the display device 103 of the information browsing device PC.

It is assumed that the manual content information 93 is saved in advance in the document management device SV. It is also assumed that the user who carries the information browsing device (the user terminal) PC is located near the image forming apparatus MFP.

In step A11 in the image forming apparatus MFP illustrated in FIG. 16, the two-dimensional coded information (the browsing destination code) of the browsing destination information, which corresponds to the occurred event, is displayed on the display device 13 of the image forming apparatus MFP.

In step C11 in the information browsing device PC, the user who carries the information browsing device (the user terminal) PC performs the operation to capture the image of the browsing destination code, which is displayed on MFP, by using the camera of the PC.

In step C12, the image data of the captured browsing destination code is stored as the captured image data 121.

In step C13, the browsing destination information that corresponds to the browsing destination code is acquired from the captured image data 121.

In step C14, the content request that contains the acquired browsing destination information is generated.

In step C15, the generated content request is transmitted to the document management device SV.

In step B11 in the document management device SV, the content request is received. In step B12, the browsing destination information that is contained in the content request is acquired. Then, the selection content information 96 that corresponds to the browsing destination information is acquired by using the manual content information 93 that is saved in the storage 90.

In step B13, the acquired selection content information 96 is transmitted to the information browsing device PC that has transmitted the content request.

In step C16 in the information browsing device PC, the selection content information 96 is received.

In step C17, the selection content information 96 is displayed on the display device 103 of the information browsing device PC.

In step C18, the user refers to the displayed selection content information 96, and performs the work to handle the occurred event to the image forming apparatus MFP.

With the processing described so far, the user who carries the information browsing device PC only needs to hold the PC, move toward the image forming apparatus MFP, and perform the operation to capture the image of the browsing destination code that is displayed on the image forming apparatus MFP. In this way, the manual information (the selection content information 96) that corresponds to the occurred event to the image forming apparatus can easily be displayed on the display device 103 of the PC. Therefore, it is possible to reduce the operation burden on the user to browse the manual information that corresponds to the occurred event.

In addition, the manual information (the selection content information 96) is displayed not on the display device 13 of the image forming apparatus MFP but on the display device 103 of the PC that is carried by the user. Therefore, while carrying the PC, the user can further promptly perform the work to handle the occurred event to the image forming apparatus MFP without looking at the screen of the image forming apparatus MFP.

What is claimed is:

1. An information processing apparatus that implements a predetermined function comprising:
   a display device;
   a storage that stores device setting information including model information of the information processing apparatus, the device setting information being unique information, with which the information processing apparatus is identifiable;
   an event detector that detects an event, the event occurring when the predetermined function is implemented;
   an occurred event determination device that determines a content of the detected event, and acquires event detection information used to identify the content of the detected event;
   a browsing destination information generator that generates browsing destination information for at least acquiring manual information corresponding to an occurred event by using the device setting information and the event detection information; and a browsing destination information display device that displays the generated browsing destination information on the display device, wherein the browsing destination information includes:
- connection destination information used to connect to a document management device, in which the manual information corresponding to the occurred event is saved;
- the event detection information; and
- the device setting information, and the browsing destination information is generated as a URL that includes:
- the information used to connect to the document management device; and
- information with which a storage area is identifiable, the storage area for saving, in the document management device, the manual information corresponding to the occurred event.

2. The information processing apparatus according to claim 1, wherein
the browsing destination information display device displays, on the display device, a two-dimensional code that is generated by encoding the browsing destination information.

3. An information browsing device comprising:
an image capturer that captures an image of the two-dimensional code of the browsing destination information displayed on the display device of the information processing apparatus according to claim 2;
a browsing destination information acquirer that acquires the browsing destination information from the captured two-dimensional code;
a manual content requester that transmits a content request containing the acquired browsing destination information to a document management device, the document management device saving the manual information that corresponds to the occurred event;
a second display device; and
a manual content display device that displays, on the second display device, manual content information transmitted from the document management device, the manual content information being the manual information corresponding to the occurred event.

4. A document management device comprising:
a second storage that saves the manual content information including a plurality of pieces of manual information, each of which is associated with an event that is happenable in the information processing apparatus;
a manual content request receiver that receives the content request from the information browsing device according to claim 3;
a manual content selector that selects selection content information from the manual content information saved in the second storage by using the acquired browsing destination information contained in the content request, the selected selection content information being associated with an event that occurs in the information processing apparatus identified by the acquired browsing destination information; and
a manual content transmitter that transmits the selection content information to the information browsing device.

5. The information browsing device according to claim 3, wherein
the information browsing device is a mobile terminal that is carried by a user who uses the information processing apparatus.

6. The information processing apparatus according to claim 1, wherein
the device setting information further includes:
- information on a language that is used in the information processing apparatus;
- information on a region where the information processing apparatus is installed; and
- version number information of software that is used in the information processing apparatus.

7. The information processing apparatus according to claim 1, wherein
the event detector includes:
- an action detector that detects action of the information processing apparatus and failure occurred to the information processing apparatus; and
- an operation detector that detects an operation and work performed for the information processing apparatus, wherein the manual information at least contains information used to assist with implementation of a function of, maintenance of, and an input operation on the information processing apparatus.

8. The information processing apparatus according to claim 1, wherein
the information processing apparatus is an image forming apparatus that has a plurality of functions.

9. A manual information processing system in which an information processing apparatus implementing a predetermined function, a document management device saving manual information about the information processing apparatus, and an information browsing device displaying the manual information about the information processing apparatus are connected via a network, wherein the information processing apparatus includes:
a first display device;
a first storage that stores device setting information, the device setting information being unique information with which the information processing apparatus is identifiable, and including model information of the information processing apparatus;
an event detector that detects an event occurring when the predetermined function is implemented;
an occurred event determination device that determines a content of the detected event and acquires event detection information used to identify the content of the detected event;
a browsing destination information generator that generates browsing destination information for at least acquiring manual information corresponding to the occurred event by using the device setting information and the event detection information; and
a browsing destination information display device that displays, on the first display device, a two-dimensional code generated by encoding the generated browsing destination information, the information browsing device includes:
an image capturer that captures an image of the two-dimensional code of the generated browsing destination information displayed on the first display device of the information processing apparatus;
a browsing destination information acquirer that acquires the generated browsing destination information from the captured two-dimensional code; and
a manual content requester that transmits a content request containing the acquired browsing destination information to a document management device, the document management device saving the manual information corresponding to the occurred event, the document management device includes:

a second storage that saves the manual content information including a plurality of pieces of manual information, each of which is associated with an event that is happenable in the information processing apparatus;

a manual content request receiver that receives the content request from the information browsing device;

a manual content selector that selects selection content information from the manual content information saved in the second storage by using the acquired browsing destination information contained in the content request, the selected selection content information being associated with an event that has occurred in the information processing apparatus identified by the acquired browsing destination information; and a manual content transmitter that transmits the selection content information to the information browsing device, and the information browsing device further includes:

a second display device; and a manual content display device that displays selection content information on the second display device, the selection content information being the manual information corresponding to the occurred event and transmitted from the document management device.

10. A manual information processing method for an information processing apparatus including a controller, the method comprising:

storing device setting information that is unique information, with which the information processing apparatus is identifiable, and that includes model information of the information processing apparatus;

detecting an event that occurs when a predetermined function of the information processing apparatus is implemented;

determining a content of the detected event and acquiring event detection information used to identify the content of the detected event;

generating browsing destination information for at least acquiring manual information corresponding to the occurred event by using the device setting information and the event detection information; and displaying the generated browsing destination information, wherein the browsing destination information includes:

connection destination information used to connect to a document management device, in which the manual information corresponding to the occurred event is saved;

the event detection information; and the device setting information, and the browsing destination information is generated as a URL that includes:

the information used to connect to the document management device; and information with which a storage area is identifiable, the storage area for saving, in the document management device, the manual information corresponding to the occurred event.

11. A manual information processing method for a manual information processing system in which an information processing apparatus implementing a predetermined function, a document management device saving manual information about the information processing apparatus, and an information browsing device displaying the manual information about the information processing apparatus are connected via a network, the manual information processing method causing a first controller provided to the information processing apparatus to:

store device setting information that is unique information, with which the information processing apparatus is identifiable, and includes model information of the information processing apparatus;

detect an event that occurs when the predetermined function is implemented;

determine a content of the detected event and acquiring event detection information used to identify the content of the detected event;

generate browsing destination information for acquiring manual information at least corresponding to the occurred event by using the device setting information and the event detection information; and display, on a display screen of the information processing apparatus, a two-dimensional code that is generated by encoding the generated browsing destination information, the manual information processing method further causing a second controller provided to the information browsing device to:

capture an image of the two-dimensional code of the generated browsing destination information that is displayed on the display screen of the information processing apparatus;

acquire the generated browsing destination information from the captured the two-dimensional code; and transmit a content request that contains the acquired browsing destination information to a document management device that saves the manual information corresponding to the occurred event, the manual information processing method further causing a third controller provided to the document management device to:

save the manual content information containing a plurality of pieces of manual information, each of which is associated with an event that is happenable in the information processing apparatus;

receive the content request from the information browsing device;

select selection content information from the saved manual content information by using the acquired browsing destination information contained in the content request, the selected selection content information being associated with an event that occurs in the information processing apparatus identified by the browsing destination information; and transmit the selected selection content information to the information browsing device, and the manual information processing method further causing a second controller provided to the information browsing device to display, on a display screen of the information browsing device, the selection content information that is the manual information corresponding to the occurred event and is transmitted from the document management device.

* * * * *